US012729305B2

(12) United States Patent
Hornig et al.

(10) Patent No.: US 12,729,305 B2
(45) Date of Patent: Sep. 8, 2026

(54) HYBRID ELASTOMERIC MATERIAL

(71) Applicants: ElringKlinger AG, Dettingen (DE); CHT Germany GmbH, Tuebingen (DE)

(72) Inventors: Roy Hornig, Bad Urach (DE); Peter Will, Moessingen (DE); Petr Schurek, Burladingen (DE)

(73) Assignees: EKPO Fuel Cell Technologies GmbH, Dettingen (DE); CHT Germany GmbH, Tuebingen (DE)

( * ) Notice: Subject to any disclaimer, the term of this patent is extended or adjusted under 35 U.S.C. 154(b) by 736 days.

(21) Appl. No.: 17/989,321

(22) Filed: Nov. 17, 2022

(65) Prior Publication Data

US 2023/0092246 A1 Mar. 23, 2023

Related U.S. Application Data

(63) Continuation of application No. PCT/EP2021/063022, filed on May 17, 2021.

(30) Foreign Application Priority Data

May 20, 2020 (DE) ........................ 102020113737.0

(51) Int. Cl.
*C08L 83/04* (2006.01)
*C08J 3/22* (2006.01)
(Continued)

(52) U.S. Cl.
CPC .............. *C08L 83/04* (2013.01); *C08J 3/226* (2013.01); *C08J 3/246* (2013.01); *C08L 23/02* (2013.01);
(Continued)

(58) Field of Classification Search
None
See application file for complete search history.

(56) References Cited

U.S. PATENT DOCUMENTS 5,057,151 A 10/1991 Schuster et al.
10,907,037 B2 * 2/2021 Soga ...................... C08L 23/22
(Continued)

FOREIGN PATENT DOCUMENTS

WO WO-2007033801 A1 * 3/2007 .......... C09K 3/1018

OTHER PUBLICATIONS

Hornig, R., "Alken-Hydrosilylierung bei VBN-EPDM-Elastomeren", GAK Gummi Fasern Kunststoffe Jahrgang 70, Sep. 2017, Seiten 584-597.

(Continued)

*Primary Examiner* — Kevin M Bernatz
(74) *Attorney, Agent, or Firm* — Womble Bond Dickinson (US) LLP

(57) ABSTRACT

An elastomeric material is disclosed, which is suitable, in particular, as a sealing material between the fuel cells of a fuel cell stack and the stacks as such, wherein the hybrid elastomeric material includes a hybrid elastomer with a proportion of a siloxane polymeric material and a proportion of a polyolefin elastomeric material, wherein the two materials are crosslinked with one another by addition. Further aspects relate to polyelectrolyte fuel cells, which include sealing elements made of the hybrid elastomeric material, as well as the use of the hybrid elastomeric material in a screen printing process.

22 Claims, 5 Drawing Sheets

(51) Int. Cl.
*C08J 3/24* (2006.01)
*C08L 23/02* (2025.01)
*H01M 8/0284* (2016.01)
*H01M 8/241* (2016.01)

(52) U.S. Cl.
CPC ......... *H01M 8/0284* (2013.01); *H01M 8/241* (2013.01); *C08J 2323/02* (2013.01); *C08J 2383/04* (2013.01); *C08J 2423/02* (2013.01); *C08J 2483/04* (2013.01); *C08L 2203/20* (2013.01); *C08L 2205/03* (2013.01); *C08L 2310/00* (2013.01); *C08L 2312/08* (2013.01)

(56) References Cited

U.S. PATENT DOCUMENTS

| | | | | |
|---|---|---|---|---|
| 2009/0171056 | A1 | 7/2009 | Hofmann et al. | |
| 2011/0098435 | A1 | 4/2011 | Hofmann et al. | |
| 2019/0300690 | A1 | 10/2019 | Soga et al. | |
| 2022/0064445 | A1* | 3/2022 | Oka | C08G 77/12 |
| 2022/0250370 | A1* | 8/2022 | Moncada | B32B 27/32 |
| 2024/0052106 | A1* | 2/2024 | Yamazaki | B32B 25/20 |

OTHER PUBLICATIONS

Ciolino, A.E., et al., "Synthesis of polybutadiene-graft-poly(dimethylsiloxane) copolymers with hydrosilylation reactions," Journal of Polymer Science: Part A: Polymer Chemistry, vol. 42, No. 11, 2004, pp. 2920-2930. doi: 10.1002/pola.20032.

* cited by examiner

HYBRID ELASTOMERIC MATERIAL

CROSS-REFERENCE TO RELATED APPLICATIONS

This application is a continuation of international application number PCT/EP2021/063022, filed on May 17, 2021, and claims the benefit of German application number 10 2020 113 737.0, filed on May 20, 2020, which applications are incorporated herein in their entirety by reference and for all purposes.

BACKGROUND OF THE INVENTION

The invention relates to a hybrid elastomeric material, in particular for use as a sealing material in fuel cells, for drinking water lines, and as a biocompatible material for medical applications (e.g., for implants).

Elastomeric sealing materials employed in a variety of manners and, in particular, are often subject to conditions that require a high chemical long-term stability in aqueous media of acidic, neutral, or alkaline nature under simultaneous mechanical pressing, in addition to temperature loads of up to about 120° C.

The conditions to which elastomeric material are subject in fuel cells, in particular solid polymer fuel cells, require above all a high extraction resistance so that contamination out of the sealing material can be avoided and the function of electrochemical processes in the fuel cells is not negatively affected. Reaction byproducts are therefore to be minimized as much as possible in the production of the materials, in particular in the crosslinking operation.

Furthermore, in the case of elastomeric materials for fuel cells, a barrier function against gas permeation is required, which however can be significantly supported by constructive measures (degree of compression, sealing profile design).

Standard liquid silicones, so-called LSR (=liquid silicone rubber), which are crosslinked by addition by means of transition metal complexes, may possess a limited chemical resistance in aqueous media in the pressed state as a sealing material. However, they are prone to back reactions and fission reactions (hydrolysis), which include depolymerization. This applies particularly in the case of pressed sealing materials, where tensile, pressure, and shear stresses are also acting on the material.

Furthermore, the tendency towards gas permeation is very high in the case of LSR materials, i.e., pure LSR material have a worse barrier function than organic polyolefin rubbers. Butyl rubbers, isobutene-isoprene rubber (IIR), chlorobutyl rubber (CIIR), and bromobutyl rubber (BIIR) are particularly worth emphasizing.

The advantages of the liquid silicones lie in their resistance to oxidation and hot air. However, these advantages are rather secondary for use in fuel cells of the solid polymer type (proton exchange membrane fuel cells (PEM-FC)), because the aforementioned disadvantages in the relevant aqueous media with additives substantially determine the service life.

On the other hand, with polyolefinic elastomeric materials, the long-term resistance to hot air is unlimited due to their unsaturation, i.e., up to maximum temperatures of about 120° C.

These and further related aspects are addressed extensively in the scientific publication by R. Hornig "Alken-Hydrosilylierung bei VBN-EPDM-Elastomeren", GAK Gummi Fasern Kunststoffe Jahrgang 70, 9/2017, pages 584-597.

In accordance with an embodiment of the invention, an elastomeric material is provided, which is suited, in particular, as a sealing material between the fuel cells of a fuel cell stack and the stacks as such, has an improved hydrolysis resistance for this purpose, and in addition to a low long-term compression set and has a long-term stable sealing force behavior in aqueous media also has a sufficiently high tear resistance and elongation at break. In addition, an extraction resistance to aqueous media relevant to fuel cells must be high and a sufficient barrier function against gas permeation must be provided.

SUMMARY OF THE INVENTION

In accordance with an embodiment of the invention, a hybrid elastomeric material with the features of Claim 1 is provided.

The hybrid elastomers of the hybrid elastomeric materials in accordance with the invention have an inorganic siloxane backbone, which has been modified with elastomeric polyolefin units by means of crosslinking by addition. The polyolefin units function as protecting groups for the siloxane polymeric material against chemical attacks.

With the elastomeric polyolefin proportions in the hybrid elastomer provided in accordance with the invention, it is achieved that the siloxane backbone of the siloxane polymeric material, in particular, is better protected against hydrolysis attacks, fission and back reactions are thus reduced, and consequently the tendency towards depolymerization is reduced, which are otherwise observed in the sealing pressed state in contact with aqueous media, primarily at temperatures of about 100° C. or high under neutral, in particular also under alkaline and acidic conditions, in unprotected siloxane polymers or pure liquid silicones (LSR).

The hybrid elastomeric materials in accordance with the invention represent an optimized material, in particular in comparison to standard liquid silicone (LSR) crosslinked by addition, especially with regard to the properties of hydrolysis resistance and chemical resistance in general at temperatures of about 90° C. or higher in aqueous-acidic systems and especially in the pressed state in the use as an elastomeric sealing material.

The hybrid elastomeric materials in accordance with the invention have in particular in combination the aforementioned chemical resistance and the required static long-term sealing force behavior in a thermal environment typical for PEM-FCs at about 90° C. in aqueous media (max. about 120° C.).

Due to their stated advantageous properties, the hybrid elastomeric materials in accordance with the invention are suited, among other things, as sealing material for drinking water lines and as biocompatible material for medical applications, in particular also implants.

Here, the hybrid elastomer of the hybrid elastomeric material in accordance with the invention is obtainable with similarly ultrafast reaction kinetics at identical processing temperatures as was previously only known from the pure LSR materials.

DETAILED DESCRIPTION OF THE INVENTION

The hybrid elastomers of the hybrid elastomeric materials in accordance with the invention preferably comprise a siloxane polymeric material with one or more (poly)siloxanes with pendant groups and/or terminal groups, which are selected from H, $C_1$-$C_{30}$ alkyl groups, $C_2$-$C_{30}$ alkenyl groups, and aryl groups. While a first polysiloxane with terminal vinyl groups functions as a base polymer, the optional further (poly)siloxanes are selected from the viewpoint of chain extension and the crosslinking of the hybrid elastomer.

Hybrid elastomers used in accordance with the invention are further preferably based on polyolefin elastomers, which have pendant and/or terminal vinyl groups.

In preferred hybrid elastomers, the siloxane polymeric material comprises a modified poly(dimethylsiloxane) or a plurality of modified poly(dimethylsiloxanes) and/or modified siloxanes. Here, the modification comprises at least vinyl groups and SiH groups, which may be present in the same or in different (poly)dimethylsiloxanes in the total formulation.

The siloxane polymeric material further preferably comprises one or more siloxane polymers of formula (I)

(I)

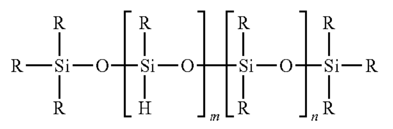

wherein the radicals R independent of one another mean H, $CH_3$, vinyl, phenyl, $(CH_2)_xCH_3$, and/or $C_3H_6O(C_2H_4O)_y(C_3H_5O)_zR'$; wherein m=1 to about 100,
n=0 to about 1000,
x=1 to about 30,
y=0 to about 20,
z=0 to about 30,
and wherein the sum m+n≥3 and R' mean H, $CH_3$ or $(CH_2)_xCH_3$.

Here, chain-extending dimethylsiloxane units preferably determine the arrangement or the sequence of the reactive groups along the backbone of the siloxane polymeric material.

Further preferably, the siloxane polymer of formula (I) is used in combination with the (poly)siloxane of formula (II) in the siloxane polymeric material in accordance with the invention:

(II)

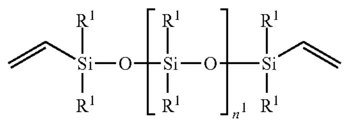

wherein the radicals $R^1$ independent of one another each mean $CH_3$, vinyl, and phenyl and $n^1$ has a value in the range of 0 to about 3000, in particular about 10 to about 1000.

The siloxane polymeric material that can be crosslinked by addition and the polyolefin elastomeric material are typically present in the hybrid elastomeric materials in accordance with the invention catalytically crosslinked with one another by addition.

The siloxane polymeric material and the polyolefin elastomeric material of the hybrid elastomeric material are preferably crosslinked by addition using a siloxane crosslinker.

Preferred siloxane crosslinkers are selected from crosslinkers of formula (III):

(III)

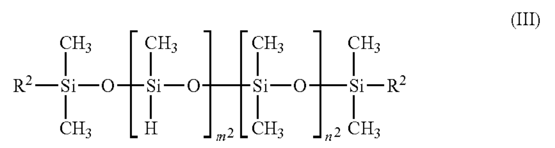

wherein the radicals $R^2$ independent of one another represent H and $CH_3$, wherein the value for $m^2$ is in the range of 1 to about 100 and the value for $n^2$ is in the range of 0 to about 500. The value for $n^2$ is preferably 10 or more and, independent thereof, the value for $m^2$ is preferably 5 or more.

Further preferable are hybrid elastomers in which the siloxanes of formulas (I), (II), and (III) in total have a ratio of the proportions of SiH groups to vinyl groups in the range of about 1: 0.5 to about 1:4, in particular in the range of about 1:1.5 to about 1:2.5. This ratio affects the reaction kinetics of the crosslinking by addition.

Furthermore, hybrid elastomers are preferred in which the polyolefin elastomeric material is selected from polybutadiene, in particular 1,2-polybutadiene, 1,4-polybutadiene, block copolymers of 1,2- and 1,4-butadiene polymers, acrylonitrile rubber, hydrated acrylonitrile rubber, epoxidized liquid polybutadiene, (poly)norbornenes, each with terminal or pendant vinyl groups (in α-position), and styrene-butadiene rubber and mixtures of these polyolefin elastomers.

Further preferred hybrid elastomers have a proportion of a polyolefin elastomer with functional groups as shielding groups, which are selected, in particular, from linear and branched $C_2$-$C_5$ alkyl and alkenyl groups.

These polyolefin elastomeric materials preferably have monomer proportions with shielding groups, which are preferably in the range of 15 mole percent to about 92 mole percent. Examples of this are 1,2-polybutadienes with a monomer proportion with shielding groups of 15 mole percent, available as Nisso B-3008, and with a monomer proportion with shielding groups of 92 mole percent, available as Nisso B-3000 (each from Nippon Soda Co., Ltd., Japan). Corresponding hydrated polybutadienes are also suitable polyolefin elastomeric materials, which are available, e.g., under the product names Nisso BI-3000 and Nisso BI-3015 from Nippon Soda C., Ltd., Japan.

Alternatively, polybutadienes with hydroxyl terminal groups may be used as polyolefin elastomeric materials, as are sold, e.g., under the products names Poly bd R-20LM (molecular weight about 1200 g/mole) and Poly bd R-45HTLO (molecular weight about 2800 g/mole) under the brand name CRAY VALLEY from Total Petrochemicals & Refining USA Inc.

Furthermore, polybutadienes, in particular in liquid form, in which a 1,4-polybutadiene proportion is dominant, and block copolymers based on 1,2-polybutadiene and 1,4-polybutadiene are preferred polyolefin elastomers. 1,4-polybutadienes of this type are available, e.g., under the product names LBR-302, LBR-307 and LBR-305 from the company Kuraray Co. Ltd, Japan. Block copolymers based on 1,2-polybutadiene and 1,4-polybutadiene are available under the product names LBR-352 and LBR-361 from the company Kuraray Co., Ltd., Japan.

The siloxane polymeric material preferably has a proportion in the total mass of the polymer portion of the hybrid elastomeric material in accordance with the invention of about 70% by weight to about 99% by weight. The corresponding proportion of the polyolefin elastomeric material, in particular 1,2-polybutadiene, in the polymer portion of the hybrid elastomeric material in accordance with the invention is preferably about 28% by weight to about 1% by weight, further preferably about 10% by weight to about 1% by weight.

Further preferably, the hybrid elastomeric material in accordance with the invention contains additives, in particular hydrophobizing and/or hydrophilic fillers, selected from silica, silicone resin, and titanates. These fillers function as acid scavengers and serve to increase the mechanical strength values. The proportion of the additives in the total mass of the hybrid elastomeric materials in accordance with the invention is preferably about 5% to about 50% by weight, further preferably about 15% to about 30% by weight. Fillers for foaming are preferably used with proportions of about 0.5% by weight to about 4% by weight in the total formulation, further preferably with proportions of about 0.2% by weight to about 2% by weight.

A particularly preferable additive is a hydrophobized and/or hydrophilic silica, which represents a reinforcing filler due to its high specific surface area. With this in mind, silicas that are listed in the following Table 1A are particularly suitable as fillers. The BET value specified in Table 1A represents the specific surface area, the carbon content is an indicator for the degree of hydrophobization of the inherently hydrophilic silica particles. The AEROSIL products are available from Evonik Industries AG.

TABLE 1A

| Silica | BET surface area [$m^2/g$] | Carbon content [%] according to ISO3262-20 |
|---|---|---|
| AEROSIL R 972 | 90-130 | 0.7-1.0 |
| AEROSIL R 974 | 150-190 | 0.8-1.4 |
| AEROSIL R 202 | 80-120 | 3.5-5.0 |
| AEROSIL R 208 | 80-140 | 4.5-6.5 |
| AEROSIL R 805 | 125-175 | 4.5-6.5 |
| AEROSIL R 812 | 230-290 | 2.0-3.0 |
| AEROSIL R 812 S | 195-245 | 3.0-4.0 |
| AEROSIL R 104 | 125-175 | 1.0-2.0 |
| AEROSIL R 816 | 170-210 | 0.9-1.8 |
| AEROSIL R 711 | 125-175 | 4.5-6.5 |
| AEROSIL R 7200 | 125-175 | 4.5-6.5 |
| AEROSIL R 8200 | 135-185 | 20-4.0 |
| AEROSIL R 9200 | 150-190 | 0.7-1.3 |
| AEROSIL R 504 | 125-175 | 2.0-4.5 |
| AEROSIL R 972 Pharma | 90-130 | — |
| AEROSIL R 976 S | 215-260 | 1.8-2.1 |
| AEROSIL RY 50 | 15-45 | 3.0-4.5 |
| AEROSIL NY 50 | 20-40 | 2.5-4.0 |
| AEROSIL RY 200 | 80-120 | 4.0-6.5 |
| AEROSIL RY 200 S | 65-95 | 3.0-5.0 |
| AEROSIL RY 200 L | 80-120 | 4.0-6.0 |
| AEROSIL RY 300 | 110-140 | 6.0-8.5 |
| AEROSIL RX 50 | 25-45 | 0.5-1.0 |
| AEROSIL NAX 50 | 30-50 | 0.5-1.0 |
| AEROSIL RX 200 | 115-165 | 1.5-3.5 |
| AEROSIL RX 300 | 180-220 | 2.5-5.0 |
| AEROSIL NX 90 G | 50-80 | 0.7-1.5 |
| AEROSIL REA 200 | 110-150 | 5.0-7.5 |
| AEROSIL REA 90 | 40-70 | 3.0-6.0 |
| AEROSIL NA 50 Y | 25-45 | 2.0-4.0 |
| AEROSIL NA 200 Y | 100-150 | 3.0-6.5 |
| AEROSIL NA 50 H | 30-50 | $<2.0$ |
| AEROSIL RA 200 HS | 120-160 | $<3.5$ |
| AEROSIL 300 V | 270-330 | — |

In general, solid particles are suitable as additives for improving the gas permeation resistance of a hybrid elastomeric material in accordance with the invention used as a sealing material.

In special applications, in particular in the case of coatings with a pore or foam structure, as explained in detail below, fillers of expandable or expanded glass or ceramic materials are used as additives. Furthermore, polymer particles on the basis of polyurethane, polyethylene, polypropylene, polyacrylate, and polycarbonate are suitable as fillers. The pore size in these fillers may be, e.g., about 1 m to about 200 μm, in particular about 1 m to about 50 μm. The pore/foam structure of a coating can be produced by polymer particles that are expandable upon curing the polymer of the coating.

For example, silanol trimethylsilyl-modified silicone resins (SiVance MQOH-7 MQ Silanol Resin from the company Milliken Chemical) may be used as silicone resin additives, preferably with a polymer viscosity of about 6000 mPas and a concentration of, e.g., about 20% by weight. Special resins modified with vinyl and/or SiH groups may be chemically bound in the hybrid elastomer used in accordance with the invention by the crosslinking reaction, which increases its chemical resistance in aqueous media.

In addition to silicone resins, so-called Si polymer softeners like, e.g., polydimethylsiloxanes (PDMS) and high-molecular hydroxy-functional polysiloxanes, may also serve to increase the protection against chemical attacks (fission reactions) in aqueous media.

The proportions of the siloxanes of formulas (I) and (II) in the total mass of the hybrid elastomer used in accordance with the invention are in total preferably about 50% by weight to about 90% by weight, further preferably about 60% by weight to about 70% by weight.

Further preferably, the siloxane polymer of formula (I) is used in the form of a mixture of two siloxane polymers with different dynamic viscosities, for example of about 10,000 mPas ($n \approx 850$) and 1,000 mPas ($n \approx 350$), wherein the weight ratio of these polymers is preferably about 1:2.

Furthermore, in a preferred siloxane polymeric material, a siloxane polymer of formula (I) is used, which has terminal SiH groups and thus assumes the function of a chain extender. The proportion of this siloxane polymer in the siloxane polymeric material is preferably about 1% to about 3% by weight.

The average molecular weight of the siloxane polymers according to formulas (I) and (II) is preferably in the range of about 30,000 to about 300,000 g/mol, particularly preferably in the range of about 60,000 to about 120,000 g/mol. The vinyl content in general may be about 0.02 to about 2.0 mmol/g polymer, preferably about 0.03 to about 0.06 mmol/g polymer.

The chemical crosslinkers and chain extenders preferred in accordance with the invention are siloxanes and/or polysiloxanes, which have reactive SiH units along the main chain and/or terminally.

The wide spectrum of the preferred crosslinkers and chain extenders has a schematic molecular structure corresponding to formulas (II) and (III).

An SiH group content of about 0.5 to about 10 mmol/g is preferred for the crosslinker and an SiH group content of about 0.5 to about 3 mmol/g is preferred for the chain extender.

Exemplary crosslinkers (also called cross-linking agents) of formula (III) are listed in the following Table 1B.

TABLE 1B

| Crosslinker of formula (III) | SiH group proportion [mmol/g] | Number of SiH groups, terminal | Number $m^2$ of pendant SiH groups | Number $n^2$ of dimethylsiloxane groups | Molecular weight [g/mol] | Viscosity [mPas] | Density [g/cm$^3$] | Product name |
|---|---|---|---|---|---|---|---|---|
| H-siloxane 11/16 | 7.3 | none | 16 | 11 | 6200 | 80 | 0.97 | Hansa SFA 11730 |
| H-siloxane 4/1/2 | 5.3 | 2 | 1 | 4 | 660 | 5 | 0.95 | |
| H-siloxane 10/6 | 4.6 | none | 6 | 10 | 1100 | 30 | 0.97 | |
| H-siloxane 23/13/2 | 4.3 | 2 | 13 | 23 | 2800 | 40 | 0.94 | Hansa SFA 11430 |
| H-siloxane 20/5 | 2.4 | none | 5 | 20 | 1900 | 40 | 0.96 | |
| H-siloxane 120/27 | 2.3 | none | 27 | 120 | 10000 | 210 | 0.97 | Hansa SFA 11230 |
| H-siloxane 25/2/2 | 1.7 | 2 | 2 | 25 | 2100 | 40 | 0.97 | Hansa SFA 13202 |
| H-siloxane 250/10 | 0.5 | none | 10 | 250 | 25900 | 1000 | 0.97 | Hansa SFA 11340 |

Silicophilic catalyst complexes based on platinum are preferably used for the production of the hybrid elastomers used in accordance with the invention, for example catalyst systems according to Ossko, Osborn-Fisher, Ashby, Markó, but particularly preferably Karstedt's catalysts.

Further transition metal complexes may also be based on other central atoms of the platinum group, i.e., Rh, Ru, Ir, Os, Pd. Ruthenium complexes according to the patent EP 2 004 663 B1 (Wacker AG), and ruthenium sulfoxide complexes according to the patent EP 2 285 814 B1 (Wacker AG) may be mentioned. The ligands should have a silicophilic nature. Furthermore, transition metal complexes of the lanthanide group may be mentioned that do not obey the Chalk-Harrod mechanism. The concentration of the catalysts may be in a wide range of about 5 to about 1000 ppm, preferably about 40 to about 80 ppm.

The integration of organic substances serves, as already mentioned, to optimize the chemical resistance of the hybrid elastomers against fission and back reactions in aqueous media. The organic protecting or shielding groups are chemically bonded with the polysiloxane backbone by way of a hydrosilylation reaction, i.e., are crosslinked by addition. This grafting, for example of 1,2-polybutadiene, is effected by the reaction of pendant and/or terminal vinyl groups of the polyolefin elastomer with the SiH groups on the polysiloxane backbone.

This process consumes SiH groups, which are no longer available for the actual chemical crosslinking operation when curing the hybrid elastomeric materials. The grafting reaction also occurs in parallel with the actual crosslinking operation.

Hybrid elastomers used in accordance with the invention become increasingly slowly reactive with increasing degree of grafting, for example with 1,2-polybutadiene. Here, it is recommended to use significantly higher concentrations of the crosslinker and the platinum catalyst compared to the standard LSR types. A proportion of the platinum catalyst that corresponds to a platinum content of about 40 to about 100 ppm may be preferred.

In the case of the standard LSR, 1-ethinyl-1-cyclohexanol (ECH) is used, for example with a proportion in the range of 0 to about 600 ppm relative to the total mass. In the case of the hybrid elastomers used in accordance with the invention, often an ECH content of 0 ppm is preferred, because the reaction kinetics are already reduced by the grafting reaction. Whether retarders like ECH are necessary is based also on the processing, e.g., the design of the flow path, the incubation period during the elastomeric injection molding processing by means of cold runner technology and the like. As required, the reaction kinetics and the technical properties of the hybrid elastomers can be significantly affected by varying the concentration of a reaction retarder.

In addition to the acetylenic alcohols (ECH, 3-methyl-1-dodecyn-3-ol (TMDO) etc.), alkyl maleates (dimethylmaleate (DMM), dibutylmaleate (DBM) etc.), silylated acetylenic alcohols, low-molecular silicone oils (divinyltetramethyldisiloxane (DVDS), 1,3,5,7-tetravinyltetramethyltetracyclosiloxane (ViD4) etc.), and alkyl fumarates (diallylfumarate (DAF), dimethylfumarate (DMF) etc.), and organic hydroperoxides may also be used as reaction retarders. Furthermore, organic sulfoxides, amines, diamines, amides (e.g. 5,5-dimethylhydantoin (DMH)), phosphanes, phosphites, nitriles, triazoles, oximes, diaziridines, trialkylcyanurates, and trimethylolpropane trimethacrylate (TMPTMA).

Preferably 1,2-polybutadiene is used as a polyolefinic protecting group in the hybrid elastomer used in accordance with the invention, e.g. the types Nd—BR, Co—BR, Ni—BR, Ti—BR (BR=butadiene rubber). Syndiotactic 1,2-polybutadiene is also preferably used, because it has a better low-temperature flexibility compared to the isotactic or atactic isomerism forms.

In particular, polybutadienes of formula (IV) are preferred, (IV)

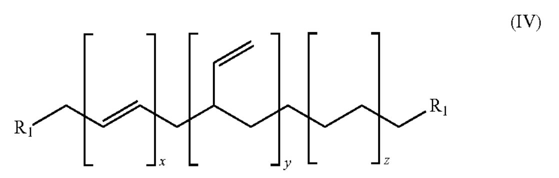

wherein the parameters x, y, and z independent of one another may each have a value in the range of 0 to about 200 depending on the polymer variant, and wherein the sum of x+y+z is about 10 to about 500, preferably about 10 to about 60. Polybutadienes of this type in which a 1,2-polybutadiene proportion is dominant (hereinafter also referred to simply as 1,2-polybutadiene) and the sum of x+y+z are about 60 are available, e.g., as Nisso B-3000 and Nisso B-3008 from Nippon Soda Co., Ltd, Japan. In the case of hydrated polybutadienes (e.g. the products Nisso BI-3000 and Nisso BI-3015), the value for the parameter x is substantially zero. The groups $R_1$ and $R_2$ represent, e.g., the groups H and OH, respectively.

Furthermore, as already mentioned, polybutadienes, in particular in liquid form, in which a 1,4-polybutadiene proportion is dominant and block copolymers based on 1,2-polybutadiene and 1,4-polybutadiene are preferred polyolefin elastomers.

A further variant of preferred polyolefin elastomers has a structure in accordance with formula (IVa):

(IVa)

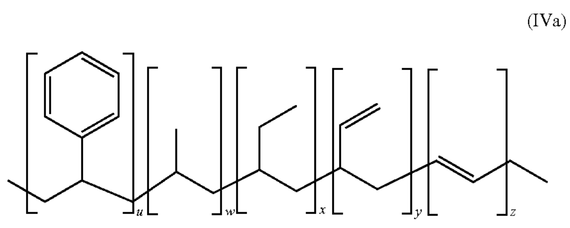

here the parameters u, w, x, y and z each independent of one another having values in the range of 0 to about 200 and the sum u+w+x+y+z of these values preferably being about 30 to about 1000.

Styrene-butadiene copolymers of formula (IVa) are available, e.g., under the trade name L-SBR-820 and L-SBR-841 from the company Kuraray Co. Ltd, Japan.

In addition, alkyl group-modified polysiloxanes for providing olefinic protecting groups are used, as depicted in formula (V).

(V)

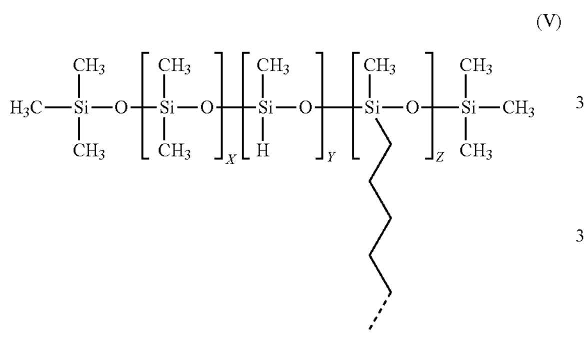

here the parameter x having a value in the range of 0 to about 500 and the parameters y and z each independent of one another having a value in the range of 1 to about 100 and the sum of x+y+z having a value of 2 to about 700.

1,2-polybutadienes of formula (IV) and polysiloxanes of formula (V) may also be used in the form of a mixture, wherein the weight proportion of the polysiloxane of formula (V) may be up to 100 times the weight proportion of the 1,2-polybutadiene. A preferred mixing ratio of the weight proportions of 1,2-polybutadiene of formula (IV) and polysiloxane of formula (V) is in the range of 1:1 to 1:5.

Moreover, liquid acrylonitrile butadiene rubber (liquid NBR) with a high isomerism proportion of 1,2-vinylbutadiene, epoxidized liquid polybutadiene with proportions of more than 70% by weight 1,2-vinylbutadiene (Nippon Soda Co., Ltd.), (poly)norbornenes with terminal vinyl groups like, e.g., 5-vinylidene-2-norbornene (VNB), 5-methyl-5-vinylidene-2-norbornene (MeVNB), 5-isopyrolidine-2-norbornene (IPNB), 5-methyallyl-2-norbornene (MANB), 5-methylidene-2-norbornene (MNB), and norbornadiene (NBD) may be used, also in combination with one another, as polyolefinic protecting groups.

Furthermore, a low-molecular styrene-butadiene rubber (SBR) with an isomerism proportion of 1,2-vinylbutadiene, and partially unsaturated or unsaturated HNBR (hydrated NBR) or NBR with a residual portion of 1,2-vinylbutadiene, is suited for providing protecting groups.

Preferred 1,2-polybutadienes (like, e.g., NISSO B-3000 and NISSO B-3008 from Nippon Soda Co., Ltd.) have an average molecular weight of about 1,000 to about 5,000 g/mol. 1,2-polybutadienes with a molecular weight of about 3,000 g/mol are particularly preferably. The vinyl group content (monomer portion) of the preferred 1,2-polybutadienes is in the range of about 15 to about 92 mole percent.

Corresponding hydrated polybutadienes are also suitable polyolefin elastomeric materials, which are available, e.g., under the product names Nisso BI-3000 and Nisso BI-3015 from Nippon Soda C., Ltd., Japan.

Alternatively, polybutadienes with hydroxyl terminal groups may also be used as polyolefin elastomeric materials, as has already been described in detail above.

The proportion of 1,2-polybutadiene, in particular with a molecular weight of about 3000 g/mol, for providing shielding groups may be about 1% by weight to about 60% by weight, in particular to about 40% by weight, further preferably to about 30% by weight, preferably also about 2% by weight to about 10% by weight, each relative to the total polymer content of the hybrid elastomeric material.

Too low or too high concentrations of shielding groups in the hybrid elastomers used in accordance with the invention are unsurprisingly qualitatively not beneficial. Grafted shielding groups should primarily hinder fission and back reactions, as already described, in aqueous media.

Too high a degree of grafting on 1,2-polybutadiene units can lead, for example, to a decrease of the tear resistance of the hybrid elastomer used in accordance with the invention, compared to a pure standard LSR material crosslinked by addition (corresponds to the backbone of the hybrid elastomer in accordance with the invention). Furthermore, the long-term sealing force behavior can deteriorate after aerobic and anaerobic hot-air degradation.

The invention further relates to a method for producing a hybrid elastomeric material in accordance with the invention, which comprises the steps:

providing a reaction mixture comprising a proportion of a siloxane polymeric material and a proportion of a polyolefin elastomeric material;

and the crosslinking of the two materials by addition.

If the hybrid elastomeric materials in accordance with the invention are produced in an injection molding process, the reaction mixture used here is typically produced from two mixture components, which are referred to hereinafter as components A and B. Both components A and B are brought together only shortly before injection, for example mixed with one another in a static mixer of an injection molding machine. The viscosities of the components A and B are preferably adapted to one another in order to achieved distribution that is as homogeneous and finely dispersed as possible when mixing. This is evident from the following formulation examples.

In the method in accordance with the invention, the reaction mixture is preferably produced from a component A and a component B, wherein the component A comprises a proportion of a first polysiloxane material, a proportion of a polyolefin material, and a catalyst for the crosslinking by addition, and wherein the component B comprises a proportion of the first polysiloxane material and a proportion of a second siloxane material that is different from the first polysiloxane material, wherein the first polysiloxane material comprises a vinyl polysiloxane with terminal vinyl groups and the second (poly)siloxane material comprises a (poly)siloxane with pendant and/or terminal SiH groups.

While only component A contains a catalyst and optionally a retarder, a crosslinker is added only to component B, which may optionally also contain a proportion of a retarder. In the sum of the proportions in both components A and B, the retarder is used in the range of 0 to about 600 ppm relative to the total weight of the reaction mixture.

In accordance with a further aspect of the method in accordance with the invention, the reaction mixture comprises a filler, in particular in the form of a hydrophobized and/or hydrophilic mineral filler.

Furthermore, in the method in accordance with the invention, the filler is provided in a masterbatch and the masterbatch is added to the reaction mixture, preferably as part of the component A and/or the component B.

The present invention further relates to a polymer electrolyte fuel cell stack with a plurality of fuel cells, wherein the stack comprises sealing elements that are produced using a hybrid elastomeric material in accordance with the invention.

The invention further relates to the use of the hybrid elastomeric materials in accordance with the invention in a screen printing process. Coatings produced in a screen printing process can be configured, in particular, as sealing elements of fuel cells. In particular, coatings with layer thicknesses in the range of about 10 μm to about 500 μm, preferably about 10 μm to about 150 μm, further preferably about 60 μm to about 120 μm, can be applied to a substrate with the screen printing process. Under static load, the layer thicknesses of about 100 μm are suitable, while for elastic applications layer thicknesses of about 80 μm to about 100 μm are particularly suitable. Such coatings may optionally be configured with a closed-cell porous structure, which can be produced in different ways, as is described in more detail below.

In such applications, in accordance with a first variant, hybrid elastomers in accordance with the invention with a filler proportion of up to about 30% by weight, in particular about 20% by weight, as well as up to about 10% by weight are used. The filler proportion is typically at least about 5% by weight. The filler is optionally also selected from expandable/expanded glass or ceramic materials. As already mentioned, polymer particles on the basis of polyurethane, polyethylene, polypropylene, polyacrylate, and polycarbonate are also suitable. The pore size in these fillers may be, e.g., about 1 μm to about 200 μm. The pore/foam structure of a coating can be produced by polymer particles that are expandable upon curing the polymer of the coating.

In particular, fine-grained powders with a particle size of about 10 μm to about 200 μm in the form of porous glass particles are suitable as fillers for hybrid elastomers with a pore structure.

With the addition of predetermined amounts of such fillers, preferably densities of the porous hybrid elastomeric material of about 0.7 g/cm$^3$ to about 1.1 g/cm$^3$ are achieved, the mechanical properties, in particular the tear resistance and elongation at break of the hybrid elastomeric material hereby being substantially maintained.

Suitable porous glass particles are available under the trade name SPHERICEL® 11W34G (average particle size about 30 to about 40 μm) or 34P30 (average particle size about 30 μm) made of molten borosilicate glass from Potters Industries Inc. Porous glass particles of the type PORAVER® with average particle sizes of about 40 to about 200 μm from the company Dennert Poraver GmbH are also suitable.

In accordance with a second variant, polymeric porous particles may be used as a filler, which often have average pore sizes in the range of about 1 μm to about 200 μm, preferably about 1 μm to about 10 μm. Concrete examples of this are EXPANCEL© products of the type DE(T), WE and FG with average particle sizes of about 5 μm to about 100 μm, available from Akzo Nobel Pulp and Performance Chemicals AB. The polymeric porous particles may be used in an amount of up to 4% by weight, preferably up to about 2% by weight, in the hybrid elastomers in accordance with the invention without impairing the silicone crosslinking.

In accordance with a third variant, a closed-cell porous structure is produced in situ or in advance in the hybrid elastomeric material in accordance with the invention. To produce such a pore or cell structure, particles on the basis of polyurethane, polyethylene, polypropylene, polyacrylates, and polycarbonates may be used, which become swollen in a suitable solvent (preferably selected from pure hydrocarbons) while absorbing the solvent and then form the pore structure by expanding under the input of thermal energy. The dosing of such fillers to hybrid elastomers in accordance with the invention is preferably limited to about 2% by weight or less, wherein a density of the hybrid elastomeric material in the range of about 0.7 g/cm$^3$ to about 1.1 g/cm$^3$ can be achieved then, too, without the mechanical properties thereof, in particular the tear resistance and the elongation at break, being too greatly impaired.

Examples of particles with particle sizes of about 5 μm to about 100 μm that can be expanded in the above sense and are commercially available are EXPANCEL® types DU, WU, MB and SL, available from Akzo Nobel Pulp and Performance Chemicals AB, or particles of the type TRACEL® INC, NC and NCS from the company Tramaco GmbH.

These and further aspects of the hybrid elastomeric materials in accordance with the invention and the hybrid elastomers used therein are explained in more detail using the following examples and the Figures.

EXAMPLES

Hybrid elastomeric materials in accordance with the invention are produced using a siloxane polymeric material and a polyolefin elastomeric material.

For the provision of the siloxane polymeric material, preferably a so-called liquid silicone (also called LSR or liquid silicone rubber) is used, which is based on a two-component (2K) addition system from the group of silicone elastomers.

On the laboratory scale, one-component (1K) mixtures can also be produced, the shelf life of which is limited, however, such that the 2K addition systems are preferred for industrial use.

For providing the two-component addition system, two ready-to-use premixtures, referred to in the following as component A and component B, are produced, which are typically mixed with one another in the ratio of 1:1. The two components A and B each contain a proportion of a so-called masterbatch, described in more detail below, which preferably provides a hydrophobized and/or hydrophilic filler, and are structured as follows (simplified):

Component A

- masterbatch
- vinyl siloxane polymer with terminally arranged vinyl groups (formula (II))
- platinum catalyst
- optionally a retarder for adapting the reaction kinetics
- optionally further functional additives or fillers Component B

- masterbatch
- vinyl siloxane polymer with terminally arranged vinyl groups (formula (II))
- crosslinker in the form of a pendant H-modified siloxane (formula (I))
- chain extender in the form of a pendant H-modified siloxane (formula (I))
- crosslinker of formula (III)
- optionally a retarder for adapting the reaction kinetics
- optionally further functional additives or fillers Functional additives are optionally used to optimize the properties of the hybrid elastomeric material in accordance with the invention for specific applications, in particular its chemical resistance.

The respective masterbatch used in components A and B comprises a vinyl siloxane polymer with terminal vinyl groups (formula (II)) as a reaction medium, which, according to the following examples, is crosslinked with hydrophobized silica produced in-situ.

Hydrophobized silica can be produced, e.g., by hydrophilic pyrogenic silica being substantially homogeneously mixed with the vinyl siloxane polymer of formula (II), which in this stage functions as a reaction medium, in a double-Z mixer. Here, the hydrophilic OH groups of the silica are replaced by trimethylsilyl groups of the added hydrophobizing agent. The production of such products is generally known and is described, e.g., in the patent EP 0 378 785 A1, Examples 5 and 7.

A specific example for a composition of a masterbatch with which a hydrophobized pyrogenic silica can be provided is listed in the following Table 2 as Masterbatch 1. This composition also serves as the masterbatch in most of the following examples.

TABLE 2

(Masterbatch 1; MBA 37130)

| Proportion [% by weight) | Constituent/Function | Available as |
|---|---|---|
| 61.0 | vinyl-polysiloxane with terminal vinyl groups (10,000 mPas) formula (II), vinyl content 0.03 mmol/g/base polymer | HANSA SFA 42103 |
| 4.0 | hexamethyldisilizane (HDMS)/hydrophobizing agent | |
| 1.0 | 1,3-divinyltetramethyldisilizane (1,3-DVTMDS)/hydrophobizing agent | |
| 2.0 | deionized water/catalyst | |
| 32.0 | hydrophilic pyrogenic silica/filler | AEROSIL 300V, Evonik |

In addition to the Masterbatch 1 of Table 2, a Masterbatch 2 according to Table 3 may alternatively be used, which differs from Masterbatch 1 with regard to the fillers used, i.e. for the purpose of hydrophobization and further filler reinforcement, it contains a mixture of two different silicas, i.e. it contains Aerosil 814 (Evonik Industries) in addition to Aerosil 300V (see Example 3, BF146). The concentrations of Masterbatch 2 in the components A and B in the formulation of Example 3 (BF146) differ from those of the formulation of Example 2 (BF131).

TABLE 3A (Masterbatch 2)

| Proportion [% by weight] | Constituent/Function | Available as |
|---|---|---|
| 61.0 | vinyl-polysiloxane with terminal vinyl groups (10,000 mPas) formula (II)/base polymer | HANSA SFA 42103 |
| 4.0 | hexamethyldisilizane (HDMS)/hydrophobizing agent | |
| 1.0 | 1,3-divinyltetramethyldisilizane (1,3-DVTMDS)/hydrophobizing agent | |
| 2.0 | deionized water/catalyst | |
| 16.0 | hydrophilic pyrogenic silica/filler | AEROSIL 300V, Evonik |
| 16.0 | hydrophobic silica/filler | AEROSIL 814, Evonik |

Furthermore, a Masterbatch 3 according to Table 3A may be used, which is referred to in the following as MBA 37121.

TABLE 3A (Masterbatch 3; MBA 37121)

| Proportion [% by weight] | Constituent/Function | Available as |
|---|---|---|
| 69.5 | vinyl-polysiloxane with terminal vinyl groups (10,000 mPas) formula (II)/base polymer | HANSA SFA 42103 |
| 3.0 | hexamethyldisilizane (HDMS)/hydrophobizing agent | |
| 0.5 | 1,3-divinyltetramethyldisilizane (1,3-DVTMDS)/hydrophobizing agent | |
| 2.0 | deionized water/catalyst | |
| 25.0 | hydrophilic silica/filler | SIPERNAT 160; Evonik |

For the separate production of components A and B of the following examples, a planetary dissolver is used that satisfies the following requirements:

The mixing vessel hold about 1 liter and is provided with a double jacket with a cooling water connection. A vacuum pump is required for removing air from the mixture. Filling at the planetary dissolver takes place by means of a press under pressure.

The components A and B each contain a proportion of a vinyl polysiloxane with terminal vinyl groups (65,000 mPas) (base polymer), available as Silopren U65 from Momentive Performance Materials GmbH, or as ALPA-VINYLPOLYMER 65 from CHT Germany GmbH, the proportion of which is varied to equalize the viscosities of the respective components.

As already described above, the following parameters preferably apply for the composition of the total mass of the hybrid elastomeric materials in accordance with the invention:

The proportions of the siloxane polymer(s) of formula (I) and optionally (II) in the total mass of the polymer portion of the hybrid elastomeric material in accordance with the invention is preferably about 50% by weight to about 90% by weight, further preferably about 60% to about 70% by weight.

Further preferably, the siloxane polymer of formula (I) is used in the form of a mixture of polymers with a dynamic viscosity of about 10,000 mPas ($n \approx 850$) and 1,000 mPas ($n \approx 350$), wherein the weight ratio of these units is preferably about 1:2. The total proportion of said siloxane polymers in the composition of the hybrid elastomer used in accordance with the invention is preferably about 62% to about 67% by weight.

Furthermore, in a preferred siloxane polymeric material, a siloxane polymer of formula (I) is used, which has terminal SiH groups and thus can take on the function of a chain extender. The proportion of said siloxane polymer in the siloxane polymeric material is preferably about 1% to about 10% by weight, particularly preferably about 1% to about 3% by weight.

Within these preferred specifications, a wide variation of the individual constituents of formulations is possible, as is summarized in the following Tables 4A and 4B for the components A and B:

TABLE 4A (Component A)

| Proportion [% by weight] | Constituent |
|---|---|
| 1-80 | masterbatch with hydrophobized filler and base siloxane polymer (e.g. vinyl polysiloxane with terminal vinyl groups) |
| 1-50 | base siloxane polymer (e.g. polysiloxane with terminal vinyl groups) |
| 1-30 | elastomeric polyolefin (e.g. 1,2-polybutadiene) |
| 1-10 | inert filler (e.g. $TiO_2$ pigment) |
| 1-10 | modified inert filler (e.g. modified $TiO_2$ pigment) |
| 1-50 ppm | addition catalyst (e.g. Pt(0) Karstedt complex) |

TABLE 4B (Component B)

| Proportion [% by weight] | Constituent |
|---|---|
| 1-80 | masterbatch with hydrophobized filler and base siloxane polymer (e.g. vinyl polysiloxane with terminal vinyl groups) |
| 1-50 | base siloxane polymer (e.g. polysiloxane with terminal vinyl groups) |
| 1-20 | polysiloxane with crosslinker function |
| 1-10 | polysiloxane with chain extender function |
| 1-10 | polysiloxane with crosslinker function |
| 0-1 | optional retarder |

In addition to the masterbatch, e.g. of Table 2 (ALPA MBA 37130), component A contains the platinum catalyst and a base polymer (e.g. liquid silicone Silopren U65, viscosity: 65,000 mPas, manufacturer: Momentive Performance Materials GmbH), the proportion of which can be varied to match the viscosity to the viscosity of component B.

Component A preferably contains a silicophilic catalyst complex based on platinum, e.g. catalyst systems according to Ossko, Osborn-Fisher, Ashby, Markó, but preferably Karstedt's catalysts.

Further transition metal complexes may also be based on other central atoms of the platinum group, i.e., Rh, Ru, Ir, Os, Pd. Ruthenium complexes according to the patent EP 2 004 663 B1 (Wacker AG), and ruthenium sulfoxide complexes according to the patent EP 2 285 814 B1 (Wacker AG) may be mentioned. The ligands should have a silicophilic nature. Furthermore, transition metal complexes of the lanthanide group may be mentioned that do not obey the Chalk-Harrod mechanism. The concentration of the catalyst in component A can be varied in a wide range of about 5 to about 1000 ppm, the concentration is preferably in the range of about 30 to about 80 ppm. In the total formulation, the catalyst is present at half the concentration, because the component A is mixed with component B, which contains no catalyst, at a ratio of 1:1.

By contrast, in addition to the masterbatch, for example of Table 2 (ALPA MPA 37130), the component B contains a combination of different crosslinkers, for example so-called standard crosslinkers (Hansa SFA 11230) or soft crosslinkers (Hansa SFA 11340), and a chain extender (Hansa SFA 12010). Furthermore, component B contains the vinyl polysiloxane with terminal vinyl groups (Silopren U65), the proportion of which can also be modified to adapt the viscosity to the viscosity of component A, and optionally also a retarder, for example 1-ethinyl-1-cyclohexanol (ECH).

The concentration and the chemical structure of the so-called standard and soft crosslinkers contained in component B influence the conversion and the kinetics of the chemical crosslinking reaction.

The siloxane crosslinker and chain extender in component B, for example Hansa SFA 11340, Hansa SFA 11230 and Hansa SFA 12010, have reactive SiH units along the main chain and/or terminally. The wide spectrum of the available Hansa SFA products from CHT Germany GmbH correspond to formulas (II) and (III). Together they may be contained in component B at 1% by weight to about 30% by weight, preferably at about 12% by weight to about 20% by weight.

The ALPA and HANSA constituents of components A and B in the following examples are commercially available from CHT Germany GmbH.

Example 1 in Accordance with the Invention (BF 109)

Component A

| Proportion [% by weight] | Constituent | Available as |
|---|---|---|
| 63.0 | Masterbatch 1 Table 2 | ALPA-MBA 37130 |
| 24.99 | polysiloxane with terminal vinyl groups (65,000 mPas), vinyl content: 0.03 mmol/g, formula (II) | ALPA-VINYLPOLYMER 65 |
| 0.01 | Pt(0) Karstedt's catalyst | ALPA-KAT 1 |
| 4.0 | 1,2-polybutadiene | B-3000, Nippon Soda, Japan |
| 6.0 | $TiO_2$ pigment | IRIOTEC 8850, Merck KGaA |
| 2.0 | $TiO_2$ pigment | KRONOS 2300, Kronos Titan GmbH |

630 g of Masterbatch 1 of Table 2, 249.9 g of vinyl polysiloxane with terminal vinyl groups (65,000 mPas) (formula (II)), and 40 g of 1,2-polybutadiene are weighed into the mixing vessel of the planetary dissolver and are homogenized for 10 minutes at a speed of 10 rpm of the planetary drive and 1,000 rpm of the dissolver. Then 60 g of the $TiO_2$ pigment IRIOTEC 8850 and 20 g of the $TiO_2$ pigments KRONOS 2300 are incorporated at the same rotational speed. As soon as the mass is homogeneous (after about 60 minutes), 0.1 g of the Pt(0) Karstedt's catalyst are added and the entire mass is homogenized for two hours under vacuum of 100 mbar in the dissolver. The temperature must be kept under 30° C.

Component B

| Proportion [% by weight] | Constituent | Available as |
|---|---|---|
| 69.65 | Masterbatch 1 Table 2 | ALPA-MBA 37130 |
| 10.12 | polysiloxane with terminal vinyl groups (65,000 mPas), vinyl content: 0.03 mmol/g, formula (II) | ALPA-VINYLPOLYMER 65 |
| 12.6 | polysiloxane of formula (III) (200 mPas), H content 2.4 mmol/g | HANSA SFA 11230 |
| 2.36 | polysiloxane of formula (I) (35 mPas) H content 1.4 mmol/g | HANSA SFA 12010 |
| 5.27 | polysiloxane of formula (III) (4000 mPas) H content 0.31 mmol/g | HANSA SFA 11340 |

696.5 g of Masterbatch 1 of Table 2 and 101.2 g of vinyl polysiloxane with terminal vinyl groups (65,000 mPas) of formula (II) are weighed into the mixing vessel of the planetary dissolver and are homogenized for 10 minutes at a rotational speed of 10 rpm of the planetary drive and 1,000 rpm of the dissolver. Then 126 g of polysiloxane of the type HANSA SFA 11230 as a crosslinker, 23.6 g of polysiloxane of the type HANSA SFA 12010 as a chain extender, and 52.7 g polysiloxane of the type HANSA SFA 11340 as a passivating agent are incorporated at the same rotational speed. As soon as the mass is homogeneous (after about 30 minutes), it continuous to be homogenized under vacuum of 100 mbar for another 2 hours. The temperature must be kept under 30° C.

Components A and B are mixed with one another in the weight ratio of 1:1 and the polymer constituents are subject to crosslinking by addition as described below.

Examples 1A, 1B, 1C, and 1D (in Accordance with the Invention)

In Examples 1A, 1B, and 1C, when mixing the masterbatch with the vinyl polysiloxane component, 2% by weight, relative to the respective formulation, of a filler for forming a closed-cell porous cell structure is added to each of the two components A and B; in Example 1D 5% by weight of filler relative to the total weight of the formulation are added.

| Example variants | Filler type | Average particle size [μm] | Density [g/cm$^3$] | Available as |
|---|---|---|---|---|
| Example 1A | PU copolymer | 140 | 0.03 | UNICELL MS140 DS |
| Example 1B | PU copolymer | 40 | 0.02 | Expancel461 D40 |
| Example 1C | glass microspheres | 90 | 0.12 | Q-Cel 300 |
| Example 1D | glass microspheres | 85 | 0.14 | Q-Cel 6014 |

UNICELL fillers are available from Tramaco GmbH

Expancel fillers are available from Akzo Nobel Pulp and Performance Chemicals AB Q-Cel fillers are available from Potters Industries LLC (The Cary Company)

Example 1E in Accordance with the Invention (BF 109B)

The formulation corresponds overall to Example 1 with the exception that hydrated polybutadiene BI-3015 is contained at 4% by weight in component A in place of the 1,2 polybutadiene B-3000. The production of the hybrid elastomer takes place as in Example 1 (BF 109).

Example 2 in Accordance with the Invention (BF 131)

Component A

| Proportion [% by weight] | Constituent | Available as |
|---|---|---|
| 62.88 | Masterbatch 1 Table 2 | ALPA-MBA 37130 |
| 19.0 | polysiloxane with terminal vinyl groups (65,000 mPas), vinyl content: 0.03 mmol/g, formula (II) | ALPA-VINYLPOLYMER 65 |
| 0.09 | Pt(0) Karstedt's catalyst | ALPA-KAT 1 |
| 2.6 | 1,2-polybutadiene | B-3000, Nippon Soda, Japan |
| 13.43 | silicone resin | MQ-OH 7, Milliken Chemical |
| 2.0 | $TiO_2$ pigment | KRONOS 2300, Kronos Titan GmbH |

628.8 g of Masterbatch 1 of Table 2, 190 g of vinyl polysiloxane with terminal vinyl groups (65,000 mPas) of formula (II), and 26 g of 1,2-polybutadiene are weighed into the mixing vessel of the planetary dissolver and are homogenized for 10 minutes at a speed of 10 rpm of the planetary drive and 1000 rpm of the dissolver. Then 134.3 g of the silicone resin as a hydrophobizing and mechanically reinforcing component are incorporated at the same rotational speed. Then 20 g of the $TiO_2$ pigment are incorporated at the same rotational speed. As soon as the mass is homogeneous (about 60 minutes), 0.9 g of the Pt(0) Karstedt's catalyst are added and the entire mass is homogenized for two hours under vacuum of 100 mbar. The temperature must be kept under 30° C.

Component B

| Proportion [% by weight] | Constituent | Available as |
|---|---|---|
| 61.57 | Masterbatch 1 Table 2 | ALPA-MBA 37130 |
| 11.25 | polysiloxane with terminal vinyl groups (65,000 mPas), vinyl content: 0.03 mmol/g, formula (II) | ALPA-VINYLPOLYMER 65 |
| 16.2 | polysiloxane of formula (III) (200 mPas) H content 2.4 mmol/g | HANSA SFA 11230 |
| 2.15 | polysiloxane of formula (I) (35 mPas) H content 1.4 mmol/g | HANSA SFA 12010 |
| 4.79 | polysiloxane of formula (III) (4000 mPas) H content 0.31 mmol/g | HANSA SFA 11340 |
| 0.74 | 1,2-polybutadiene | B-3000, Nippon Soda, Japan |
| 3.3 | silicone resin | MQ-OH 7, Milliken Chemical |

615.7 g of Masterbatch 1 of Table 2 and 112.5 g of vinyl polysiloxane with terminal groups (65,000 mPas) of formula (II) are weighed into the mixing vessel of the planetary dissolver and are homogenized for 10 minutes at a speed of 10 rpm of the planetary drive and 1,000 rpm of the dissolver. Then 162 g of polysiloxane of the type HANSA SFA 11230 as a crosslinker, 21.5 g of polysiloxane of the type HANSA SFA 12010 as a chain extender, and 47.9 g of polysiloxane of the type HANSA SFA 11340 as a passivating agent are incorporated at the same speed. As soon as the mass is homogeneous (after about 60 minutes), 7.4 g of the 1,2-polybutadiene and 33 g of silicone resin are added and the entire mass is homogenized for two hours under vacuum of 100 mbar. The temperature must be kept under 30° C.

Components A and B are mixed with one another in the weight ratio of 1:1 and the polymer constituents are subject to crosslinking by addition as described below.

Example 3 in Accordance with the Invention (BF146)

Component A

| Proportion [% by weight] | Constituent | Available as |
|---|---|---|
| 65.14 | Masterbatch 2 Table 3 | |
| 24.0 | polysiloxane with terminal vinyl groups (65,000 mPas), vinyl content: 0.03 mmol/g, formula (II) | ALPA-VINYLPOLYMER 65 |
| 3.6 | 1,2-polybutadiene | B-3000, Nippon Soda, Japan |
| 1.9 | $TiO_2$ pigment | KRONOS 2300, Kronos Titan GmbH |
| 5.35 | modified $TiO_2$ pigment | Iriotec 8850, Merck KGaA |
| 0.01 | Pt(0) Karstedt's catalyst | ALPA-KAT 1 |

651.4 g of Masterbatch 2 of Table 3, 240 g of vinyl polysiloxane with terminal vinyl groups (65,000 mPas) of formula (II), and 36 g of 1,2-polybutadiene are weighed into the mixing vessel of the planetary dissolver and are homogenized for 10 minutes at a speed of 10 rpm of the planetary drive and 1000 rpm of the dissolver. Then 19.0 g of the $TiO_2$ pigment and 53.5 g of the modified $TiO_2$ pigment are incorporated at the same rotational speed. As soon as the mass is homogeneous (about 60 minutes), 0.1 g of the Pt(0) Karstedt's catalyst are added and the entire mass is homogenized for two hours under vacuum of 100 mbar. The temperature must be kept under 30° C.

Component B

| Proportion [% by weight] | Constituent | Available as |
|---|---|---|
| 65.77 | Masterbatch 2 Table 3 | |
| 10.12 | polysiloxane with terminal vinyl groups (65,000 mPas), vinyl content: 0.03 mmol/g, formula (II) | ALPA-VINYLPOLYMER 65 |
| 16.8 | polysiloxane of formula (III) (200 mPas), H content 2.4 mmol/g | HANSA SFA 11230 |
| 2.25 | polysiloxane of formula (I) (35 mPas) H content 1.4 mmol/g | HANSA SFA 12010 |
| 5.0 | polysiloxane of formula (III) (4000 mPas) H content 0.31 mmol/g | HANSA SFA 11340 |
| 0.06 | 1-ethinyl-1-cyclohexanol | ALPA Retard A |

657.7 g of Masterbatch 2 of Table 3 and 101.2 g of vinyl polysiloxane with terminal vinyl groups (65,000 mPas) of formula (II) are weighed into the mixing vessel of the planetary dissolver and are homogenized for 10 minutes at a speed of 10 rpm of the planetary drive and 1,000 rpm of the dissolver. Then 168 g of polysiloxane of the type HANSA SFA 11230 as a crosslinker, 22.5 g of polysiloxane of the type HANSA SFA 12010 as a chain extender, and 50.0 g of polysiloxane of the type HANSA SFA 11340 as a passivating agent are incorporated at the same speed. As soon as the mass is homogeneous (after about 60 minutes), 0.6 g of 1-ethinyl-1-cyclohexanol (ECH) as a retarder are added and the entire mass is homogenized for two hours under vacuum of 100 mbar. The temperature must be kept under 30° C.

Components A and B are mixed with one another in the weight ratio of 1:1 and the polymer constituents are subject to crosslinking by addition as described below.

Example 4 (Reference: Standard LSR Material ALPA 130201)

Component A

| Proportion [% by weight] | Constituent | Available as |
|---|---|---|
| 75.0 | Masterbatch 1 Table 2 | ALPA-MBA 37130 |
| 24.99 | polysiloxane with terminal vinyl groups (65,000 mPas), vinyl content: 0.03 mmol/g, formula (II) | ALPA-VINYLPOLYMER 65 |
| 0.01 | Pt(0) Karstedt's catalyst | ALPA-KAT 1 |

750 g of Masterbatch 1 of Table 2 and 249.9 g of vinyl polysiloxane with terminal vinyl groups (65,000 mPas) of formula (II) are weighed into the mixing vessel of the planetary dissolver and are homogenized for 10 minutes at a speed of 10 rpm of the planetary drive and 1,000 rpm of the dissolver. As soon as the mass is homogeneous (after about 60 minutes) 0.1 g of Pt(0) Karstedt's catalyst are added and the entire mass is homogenized for two hours under vacuum of 100 mbar. The temperature must be kept under 30° C.

Component B

| Proportion [% by weight] | Constituent | Available as |
|---|---|---|
| 69.65 | Masterbatch 1 Table 2 | ALPA-MBA 37130 |
| 10.12 | polysiloxane with terminal vinyl groups (65,000 mPas), vinyl content: 0.03 mmol/g, formula (II) | ALPA-VINYLPOLYMER 65 |
| 12.6 | polysiloxane of formula (III) (200 mPas), H content 2.4 mmol/g | HANSA SFA 11230 |
| 2.36 | polysiloxane of formula (I) (35 mPas), H content 1.4 mmol/g | HANSA SFA 12010 |
| 5.27 | polysiloxane of formula (III) (4000 mPas), H content 0.31 mmol/g | HANSA SFA 11340 |

696.5 g of Masterbatch 1 of Table 2 and 101.2 g of vinyl polysiloxane with terminal vinyl groups (65,000 mPas) of formula (II) are weighed into the mixing vessel of the planetary dissolver and are homogenized for 10 minutes at a speed of 10 rpm of the planetary drive and 1,000 rpm of the dissolver. Then 126 g of polysiloxane of the type HANSA SFA 11230 as a crosslinker, 23.6 g of polysiloxane of the type HANSA SFA 12010 as a chain extender, and 52.7 g of polysiloxane of the type HANSA SFA 11340 as a passivating agent are incorporated at the same speed. As soon as the mass is homogeneous (after about 30 minutes), it continues to be homogenized under vacuum of 100 mbar for another two hours. The temperature must be kept under 30° C.

Components A and B are mixed with one another in the weight ratio of 1:1 and the polymer constituents are subject to crosslinking by addition as described in the following section.

Example 5 in Accordance with the Invention (1% by Weight Polybutadiene Proportion)

Component A

| Proportion [% by weight] | Constituent | Available as |
|---|---|---|
| 72.49 | Masterbatch 1 Table 2 | ALPA-MBA 37130 |
| 22.5 | polysiloxane with terminal vinyl groups (65,000 mPas), vinyl content: 0.03 mmol/g, formula (II) | ALPA-VINYLPOLYMER 65 |
| 0.01 | Pt(0) Karstedt's catalyst | ALPA-KAT 1 |
| 1.0 | 1,2-polybutadiene | B-3000, Nippon Soda, Japan |
| 1.0 | $TiO_2$ pigment | Iriotec 8850, Merck KGaA |
| 3.0 | $TiO_2$ pigment | KRONOS 2300, Kronos Titan GmbH |

724.9 g of Masterbatch 1 of Table 2, 225 g of vinyl polysiloxane with terminal vinyl groups (65,000 mPas) (formula (II)), and 10 g of 1,2-polybutadiene are weighed into the mixing vessel of the planetary dissolver and are homogenized for 10 minutes at a speed of 10 rpm of the planetary drive and 1,000 rpm of the dissolver. Then 10 g of the $TiO_2$ pigment Iriotec 8850 and 30 g of the $TiO_2$ pigments KRONOS 2300 are incorporated at the same rotational speed. As soon as the mass is homogeneous (after about 60 minutes) 0.1 g of the Pt(O) Karstedt's catalyst are added and the entire mass is homogenized for two hours under vacuum of 100 mbar in the dissolver. The temperature must be kept under 30° C.

Component B

| Proportion [% by weight] | Constituent | Available as |
|---|---|---|
| 51.44 | Masterbatch 1 Table 2 | ALPA-MBA 37130 |
| 27.31 | polysiloxane with terminal vinyl groups (65,000 mPas), vinyl content: 0.03 mmol/g, formula (II) | ALPA-VINYLPOLYMER 65 |
| 11.9 | polysiloxane of formula (III) (200 mPas), H content 2.4 mmol/g | HANSA SFA 11230 |
| 1.95 | polysiloxane of formula (I) (35 mPas), H content 1.4 mmol/g | HANSA SFA 12010 |
| 6.4 | polysiloxane of formula (III) (4000 mPas), H content 0.31 mmol/g | HANSA SFA 11340 |
| 1.0 | 1,2-polybutadiene | B-3000, Nippon Soda, Japan |

514.4 g of Masterbatch 1 of Table 2, 273.1 g of vinyl polysiloxane with terminal vinyl groups (65,000 mPas) of formula (II), and 10 g of 1,2-polybutadiene are weighed into the mixing vessel of the planetary dissolver and are homogenized for 10 minutes at a rotational speed of 10 rpm of the planetary drive and 1000 rpm of the dissolver. Then 119 g of polysiloxane of the type HANSA SFA 11230 as a cross-linker, 19.5 g of polysiloxane of the type HANSA SFA 12010 as a chain extender, and 64 g polysiloxane of the type HANSA SFA 11340 as a passivating agent are incorporated at the same rotational speed. As soon as the mass is homogeneous (after about 30 minutes), it continuous to be homogenized under vacuum of 100 mbar for another 2 hours. The temperature must be kept under 30° C.

Components A and B are mixed with one another in the weight ratio of 1:1 and the polymer constituents are subject to crosslinking by addition as described below.

Example 6 in Accordance with the Invention (5% by Weight Polybutadiene Proportion)

Component A

| Proportion [% by weight] | Constituent | Available as |
|---|---|---|
| 64.46 | Masterbatch 1 Table 2 | ALPA-MBA 37130 |
| 26.2 | polysiloxane with terminal vinyl groups (65,000 mPas), vinyl content: 0.03 mmol/g, formula (II) | ALPA-VINYLPOLYMER 65 |
| 0.04 | Pt(0) Karstedt's catalyst | ALPA-KAT 1 |
| 5.0 | 1,2-polybutadiene | B-3000, Nippon Soda, Japan |
| 2.3 | $TiO_2$ pigment | Iriotec 8850, Merck KGaA |
| 2.0 | $TiO_2$ pigment | KRONOS 2300, Kronos Titan GmbH |

644.6 g of Masterbatch 1 of Table 2, 262 g of vinyl polysiloxane with terminal vinyl groups (65,000 mPas) of formula (II), and 50 g of 1,2-polybutadiene are weighed into the mixing vessel of the planetary dissolver and are homogenized for 10 minutes at a speed of 10 rpm of the planetary drive and 1000 rpm of the dissolver. Then 23 g of the $TiO_2$ pigment IRIOTEC 8850 and 20 g of the $TiO_2$ pigments KRONOS 2300 are incorporated at the same rotational speed.

As soon as the mass is homogeneous (about 60 minutes) 0.4 g of the Pt(0) Karstedt's catalyst are added and the entire mass is homogenized for two hours under vacuum of 100 mbar. The temperature must be kept under 30° C.

| Proportion [% by weight] | Constituent | Available as |
|---|---|---|
| 52.19 | Masterbatch 1 Table 2 | ALPA-MBA 37130 |
| 24.31 | polysiloxane with terminal vinyl groups (65,000 mPas), vinyl content: 0.03 mmol/g, formula (II) | ALPA-VINYLPOLYMER 65 |
| 12.1 | polysiloxane of formula (III) (200 mPas), H content 2.4 mmol/g | HANSA SFA 11230 |
| 2.1 | polysiloxane of formula (I) (500 mPas), H content 0.163 mmol/g | HANSA SFA 12010 |
| 4.3 | polysiloxane of formula (III) (4000 mPas) H content 0.31 mmol/g | Hansa SFA 11340 |
| 5.0 | 1,2-polybutadiene | B-3000, Nippon Soda, Japan |

521.9 g of Masterbatch 1 of Table 2 and 243.1 g of vinyl polysiloxane with terminal vinyl groups (65,000 mPas) of formula (II) are weighed into the mixing vessel of the planetary dissolver and are homogenized for 10 minutes at a speed of 10 rpm of the planetary drive and 1,000 rpm of the dissolver. Then 121 g of polysiloxane of the type HANSA SFA 11230 as a crosslinker, 21 g of polysiloxane of the type HANSA SFA 12010 as a chain extender, and 43 g of Hansa SFA 11340 are incorporated at the same speed. As soon as the mass is homogeneous (after about 60 minutes) 50 g of 1,2-polybutadiene are added and the entire mass is homogenized for two hours under vacuum of 100 mbar. The temperature must be kept under 30° C.

Components A and B are mixed with one another in the weight ratio of 1:1 and the polymer constituents are subject to crosslinking by addition as described below.

Example 7 in Accordance with the Invention (10% by Weight Polybutadiene Proportion) (CL253)

Component A

| Proportion [% by weight] | Constituent | Available as |
|---|---|---|
| 61.32 | Masterbatch 1 Table 2 | ALPA-MBA 37130 |
| 22.65 | polysiloxane with terminal vinyl groups (65,000 mPas), vinyl content: 0.03 mmol/g, formula (II) | ALPA-VINYLPOLYMER 65 |
| 0.35 | Pt(0) Karstedt's catalyst | ALPA-KAT 1 |
| 10.0 | 1,2-polybutadiene | B-3000, Nippon Soda, Japan |
| 4.26 | modified $TiO_2$ pigment | Iriotec 8850, Merck KGaA |
| 1.42 | $TiO_2$ pigment | KRONOS 2300, Kronos Titan GmbH |

613.2 g of Masterbatch 1 of Table 2, 226.5 g of vinyl polysiloxane with terminal vinyl groups (65,000 mPas) of formula (II), and 100 g of 1,2-polybutadiene are weighed into the mixing vessel of the planetary dissolver and are homogenized for 10 minutes at a speed of 10 rpm of the planetary drive and 1000 rpm of the dissolver. Then 42.6 g of modified $TiO_2$ pigment Iriotec 8850 and 14.2 g of $TiO_2$ pigment KRONOS 2300 as mechanically reinforcing components are incorporated at the same rotational speed. As soon as the mass is homogeneous (about 60 minutes), 3.5 g of the Pt(0) Karstedt's catalyst are added and the entire mass is homogenized for two hours under vacuum of 100 mbar. The temperature must be kept under 30° C.

Component B

| Proportion [% by weight] | Constituent | Available as |
|---|---|---|
| 55.89 | Masterbatch 1 Table 2 | ALPA-MBA 37130 |
| 8.6 | polysiloxane with terminal vinyl groups (65,000 mPas), vinyl content: 0.03 mmol/g, formula (II) | ALPA-VINYLPOLYMER 65 |
| 12.28 | polysiloxane of formula (III) (200 mPas), H content 2.4 mmol/g | HANSA SFA 11230 |
| 13.19 | polysiloxane of formula (I) (500 mPas), H content 0.163 mmol/g | H—Si 150/2 |
| 0.04 | 1-ethinyl-1-cyclohexanol | ALPA Retard A |
| 10.0 | 1,2-polybutadiene | B-3000, Nippon Soda, Japan |

558.9 g of Masterbatch 1 of Table 2 and 86 g of vinyl polysiloxane with terminal vinyl groups (65,000 mPas) of formula (II) are weighed into the mixing vessel of the planetary dissolver and are homogenized for 10 minutes at a speed of 10 rpm of the planetary drive and 1,000 rpm of the dissolver. Then 122.8 g of polysiloxane of the type HANSA SFA 11230 as a crosslinker, 131.9 g of polysiloxane of the type H—Si 150/2 as a chain extender are incorporated at the same speed. As soon as the mass is homogeneous (after about 60 minutes) 100 g of 1,2-polybutadiene and 0.40 g of the retarder ALPA Retard A are added and the entire mass is homogenized for two hours at a vacuum of 100 mbar. The temperature must be kept under 30° C.

Components A and B are mixed with one another in the weight ratio of 1:1 and the polymer constituents are subject to crosslinking by addition as described below.

Example 7A in Accordance with the Invention

The formulation corresponds overall to Example 7 with the exception that the hydrated polybutadiene BI-3015 is contained at 10.0% by weight in each of components A and B in place of the 1,2 polybutadiene B-3000. The production of the hybrid elastomer takes place as in Example 7.

Example 8 in Accordance with the Invention (20% by Weight Polybutadiene Proportion) (BF290)

Component A

| Proportion [% by weight] | Constituent | Available as |
|---|---|---|
| 54.51 | Masterbatch 1 Table 2 | ALPA-MBA 37130 |
| 20.14 | polysiloxane with terminal vinyl groups (65,000 mPas), vinyl content: 0.03 mmol/g, formula (II) | ALPA-VINYLPOLYMER 65 |
| 0.30 | Pt(0) Karstedt's catalyst | ALPA-KAT 1 |
| 20.0 | 1,2-polybutadiene | B-3000, Nippon Soda, Japan |
| 3.79 | modified $TiO_2$ pigment | Iriotec 8850, Merck KGaA |
| 1.26 | $TiO_2$ pigment | KRONOS 2300, Kronos Titan GmbH |

545.1 g of Masterbatch 1 of Table 2, 201.4 g of vinyl polysiloxane with terminal vinyl groups (65,000 mPas) of formula (II), and 200 g of 1,2-polybutadiene are weighed into the mixing vessel of the planetary dissolver and are homogenized for 10 minutes at a speed of 10 rpm of the planetary drive and 1000 rpm of the dissolver. Then 37.9 g of modified $TiO_2$ pigment Iriotec 8850 and 12.6 g of $TiO_2$ pigment KRONOS 2300 as mechanically reinforcing components are incorporated at the same rotational speed. As soon as the mass is homogeneous (about 60 minutes), 3.0 g of the Pt(0) Karstedt's catalyst are added and the entire mass is homogenized for two hours under vacuum of 100 mbar. The temperature must be kept under 30° C.

Component B

| Proportion [% by weight] | Constituent | Available as |
|---|---|---|
| 49.68 | Masterbatch 1 Table 2 | ALPA-MBA 37130 |
| 7.65 | polysiloxane with terminal vinyl groups (65,000 mPas), vinyl content: 0.03 mmol/g, formula (II) | ALPA-VINYLPOLYMER 65 |
| 10.92 | polysiloxane of formula (III) (200 mPas), H content 2.4 mmol/g | HANSA SFA 11230 |

-continued

| Proportion [% by weight] | Constituent | Available as |
|---|---|---|
| 11.72 | polysiloxane of formula (I) (500 mPas), H content 0.163 mmol/g | H—Si 150/2 |
| 0.03 | 1-ethinyl-1-cyclohexanol | ALP A Retard A |
| 20.0 | 1,2-polybutadiene | B-3000, Nippon Soda, Japan |

496.8 g of Masterbatch 1 of Table 2 and 76.5 g of vinyl polysiloxane with terminal vinyl groups (65,000 mPas) of formula (II) are weighed into the mixing vessel of the planetary dissolver and are homogenized for 10 minutes at a speed of 10 rpm of the planetary drive and 1,000 rpm of the dissolver. Then 109.2 g of polysiloxane of the type HANSA SFA 11230 as a crosslinker, 117.2 g of polysiloxane of the type H—Si 150/2 as a chain extender are incorporated at the same speed. As soon as the mass is homogeneous (after about 60 minutes) 200 g of 1,2-polybutadiene and 0.3 g of the retarder ALPA Retard A are added and the entire mass is homogenized for two hours at a vacuum of 100 mbar. The temperature must be kept under 30° C.

Components A and B are mixed with one another in the weight ratio of 1:1 and the polymer constituents are subject to crosslinking by addition as described below.

Example 8A in Accordance with the Invention (BF 290Y)

The formulation corresponds overall to Example 8 with the exception that the hydrated polybutadiene BI-3015 is contained at 20% by weight in components A and B in place of the 1,2 polybutadiene B-3000. The production of the hybrid elastomer takes place as in Example 8 (BF 290).

Example 9 in Accordance with the Invention (40% by Weight Polybutadiene Proportion) (BF 307)

Component A

| Proportion [% by weight] | Constituent | Available as |
|---|---|---|
| 40.35 | Masterbatch 3 Table 3A | ALPA-MBA 37121 |
| 14.92 | polysiloxane with terminal vinyl groups (65,000 mPas), vinyl content: 0.03 mmol/g, formula (II) | ALPA-VINYLPOLYMER 65 |
| 0.30 | Pt(0) Karstedt's catalyst | ALPA-KAT 1 |
| 40.0 | 1,2-polybutadiene | BI-3015, Nippon Soda, Japan |
| 3.32 | modified $TiO_2$ pigment | Iriotec 8850, Merck KGaA |
| 1.11 | $TiO_2$ pigment | KRONOS 2300, Kronos Titan GmbH |

403.5 g of Masterbatch 3 of Table 3A, 149.2 g of vinyl polysiloxane with terminal vinyl groups (65,000 mPas) of formula (II), and 400 g of 1,2-polybutadiene are weighed into the mixing vessel of the planetary dissolver and are homogenized for 10 minutes at a speed of 10 rpm of the planetary drive and 1000 rpm of the dissolver. Then 33.2 g of modified $TiO_2$ pigment Iriotec 8850 and 11.1 g of $TiO_2$ pigment KRONOS 2300 as mechanically reinforcing components are incorporated at the same rotational speed. As soon as the mass is homogeneous (about 60 minutes), 3.0 g of the Pt(O) Karstedt's catalyst are added and the entire mass is homogenized for two hours under vacuum of 100 mbar. The temperature must be kept under 30° C.

Component B

| Proportion [% by weight] | Constituent | Available as |
|---|---|---|
| 65.77 | Masterbatch 1 Table 2 | ALPA-MBA 37130 |
| 10.11 | polysiloxane with terminal vinyl groups (65,000 mPas), vinyl content: 0.03 mmol/g, formula (II) | ALPA-VINYLPOLYMER U65 |
| 16.87 | polysiloxane of formula (III) (200 mPas), H content 2.4 mmol/g (crosslinker I) | HANSA SFA 11230 |
| 5.00 | poly siloxane of formula (III) (4000 mPas), H content 0.31 mmol/g (crosslinker II) | HANSA SFA 11340 |
| 2.23 | polysiloxane of formula (I) (500 mPas), H content 0.163 mmol/g (chain extender) | HANSA SFA 12010 |
| 0.02 | 1-ethinyl-1-cyclohexanol | ALPA Retard A |

657.7 g of Masterbatch 1 of Table 2 and 101.1 g of vinyl polysiloxane with terminal vinyl groups (65,000 mPas) of formula (II) are weighed into the mixing vessel of the planetary dissolver and are homogenized for 10 minutes at a speed of 10 rpm of the planetary drive and 1,000 rpm of the dissolver. Then 168.7 g of polysiloxane of the type HANSA SFA 11230 as crosslinker I, 50.0 g of polysiloxane of formula (III) (4000 mPas) of the type HANSA SFA 11340 as crosslinker II, 22.3 g of polysiloxane of the type HANSA SFA 11340 as a chain extender of the type HANSA SFA 12010 are incorporated at the same speed. As soon as the mass is homogeneous (after about 60 minutes) 0.2 g of the retarder ALPA Retard A are added and the entire mass is homogenized for two hours at a vacuum of 100 mbar. The temperature must be kept under 30° C.

Components A and B are first mixed with one another in the weight ratio of 1:1 and then a further proportion of 1,2-polybutadiene of the type BI-3015 is added, such that the content of 1,2-polybutadiene in the mixture reaches a value of 40% by weight. The polymer constituents are then subject to crosslinking by addition as described below.

Optimized fast reaction kinetics can be observed, despite the high 1-2-polybutadiene proportion.

Properties of Hybrid Elastomeric Material in Accordance with the Invention Compared to Conventional LSR and EPDM Elastomers In the following, different properties of hybrid elastomeric materials in accordance with the invention are examined and compared to the corresponding properties of conventional LSR and EPDM elastomers. The results are described in detail in the following and are depicted in part in the Figures. In the drawings:

DETAILED DESCRIPTION OF THE FIGURES

Figure 1:
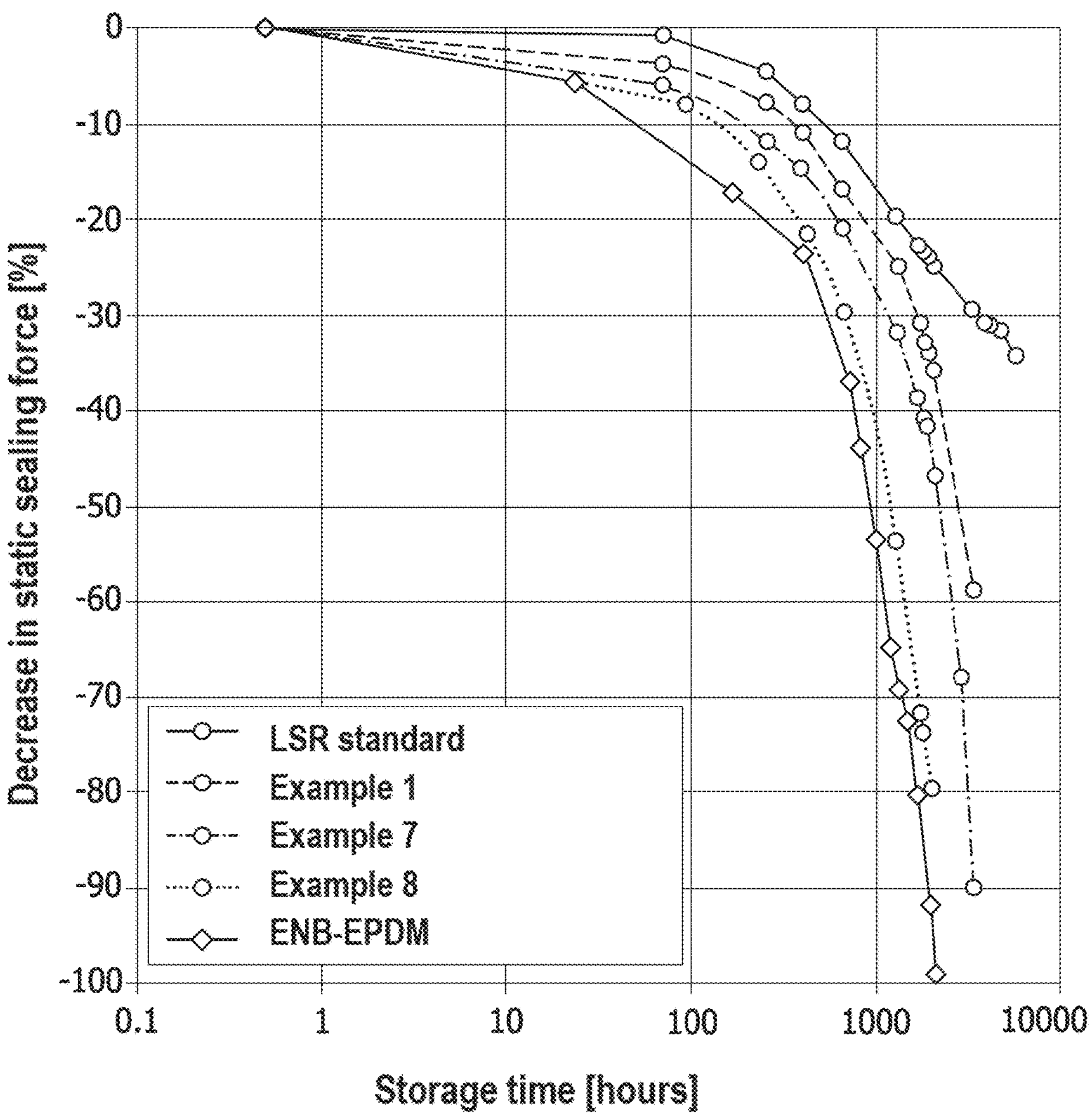
FIG. 1 shows the progression of a static long-term sealing force of conventional elastomeric materials and hybrid elastomeric materials in accordance with the invention after oxidative hot air degradation under the influence of the proportion of polyolefin protecting groups.

General Experimental Procedure for Determining the Properties of Conventional Elastomers and Hybrid Elastomeric Materials in Accordance with the Invention In order to test the application-specific properties of the elastomers obtainable from Examples 1 to 9, plates crosslinked using the respective components A and B are made as test pieces, as described in the following.

For this purpose, the two respective components A and B are brought together in a ratio of 1:1 in a vacuum speedmixer (U. Hauschild) under vacuum (about 100 mbar) at room temperature during a mixing time of about 2 minutes and then poured into the molds for the production of plates (2 mm thickness) and are vulcanized (1 h/150° C.).

The chemical crosslinking reaction during the production of the hybrid elastomeric materials in accordance with the invention begins directly after mixing components A and B, and the exposure to temperatures (20° C. to 200° C.). Both components A and B are each set to a similar viscosity level for better mixability.

Test pieces corresponding to the respective norms are produced from these plates for determining:

DIN 53505–Shore A hardness

DIN 53504S2–Tensile testing–tear resistance and elongation at break

DIN ISO 34-1, Method B, Test (a)+(b) tear resistance

ISO 188, DIN ISO 1817 Chemical resistance

Rheological properties (curemeter test), 150° C. to 180° C., 3 min.

ISO 815–Compression set test

The results are summarized in the following Tables 5 to 12 and depicted in part in FIGS. 1 to 5.

Influence of the Polyolefin Proportion on the Kinetics of the Crosslinking Reaction and on the Mechanical Properties of the Hybrid Elastomeric Materials in Accordance with the Invention Commencing from Example 1 (BF109), the influence of different concentrations of 1,2-polybutadiene in the total formulation on the kinetics of the chemical crosslinking reaction and the obtained initial mechanical values was tested. Furthermore, the viscoelastic behavior of the obtained test pieces in the compression set test is described. The material of Test Piece 4 corresponds to Example 1 (BF109). The materials of Test Pieces 1 and 2 correspond to Examples 8 and 7, respectively. The materials of Test Pieces 3 and 5 correspond to Examples 6 and 5, respectively.

The t10 value specified in Table 5 corresponds to the time in which a relative crosslinking conversion of 10% takes place at 180° C., the t90 value represents the time in which a relative crosslinking conversion of 90% is achieved. The same applies to the t50 and t80 values. The values are determined by means of so-called crosslink isotherms. They are measured on a curemeter by the torque over the measuring time indicating the increase in the internal crosslink density in the elastomeric material. A lower heated chamber half oscillates about a deflection angle, an upper heated rigid chamber half detecting the torque required therefor. Device manufacturer: GÖTTFERT Werkstoff-Prufmaschinen GmbH, MonTech Werkstoffprüfmaschinen GmbH.

The minimum describes the uncrosslinked state, while the maximum corresponds to the completely crosslinked state. The different between minimum and maximum represents the relative crosslink density.

Unlike in a pure LSR material, a reaction retarder is not absolutely necessary in the hybrid material systems in accordance with the invention, and therefore is often 0 ppm, such that the reaction kinetics can be increased.

The stress moduli obtained from the tensile testing according to DIN 53504 S2 describe the static stiffness of the crosslinked hybrid elastomeric material in accordance with the invention and correspond to the E-modulus.

The characterization of the different test pieces and the data obtained in the tests are summarized in Table 5.

TABLE 5

| Constituents | | Test Piece 1 | 2 | 3 | 4 | 5 |
|---|---|---|---|---|---|---|
| ALPA 130201 | [% by weight] | 100 | 100 | 100 | 100 | 100 |
| 1,2-polybutadiene | [% by weight] | 20 | 10 | 5 | 2 | 1 |
| Crosslinker | [% by weight] | 9 | 9 | 9 | 9 | 9 |
| Pt(0) catalyst | (ppm] | 28 | 28 | 28 | 28 | 28 |
| Crosslinking characteristics at 180° C. | | | | | | |
| Minimum | [Nm] | 0.00 | 0.00 | 0.01 | 0.04 | 0.09 |
| Maximum | [Nm] | 0.91 | 1.36 | 1.86 | 2.33 | 2.17 |
| t10 | [min] | 0.15 | 0.11 | 0.09 | 0.07 | 0.05 |
| t50 | [min] | 0.37 | 0.30 | 0.25 | 0.16 | 0.11 |
| t80 | [min] | 1.18 | 1.09 | 1.00 | 0.37 | 0.22 |
| t90 | [min] | 1.53 | 1.45 | 1.35 | 1.09 | 0.40 |
| Initial values at 23° C. (chemically crosslinked) | | | | | | |
| Hardness (DIN53505) | Shore A | 43.0 | 49.8 | 55.4 | 57.8 | 50.0 |
| Tensile testing (DIN53504 S2) | | | | | | |
| Stress modulus M25% | [MPa] | 0.60 | 0.70 | 0.90 | 0.90 | 0.70 |
| Stress modulus M50% | [MPa] | 1.11 | 1.41 | 1.79 | 1.95 | 1.26 |
| Stress modulus M100% | [MPa] | 2.20 | 2.90 | 3.60 | 3.90 | 2.50 |
| Stress modulus M200% | [MPa] | 3.56 | 4.63 | 5.62 | 6.13 | 4.70 |
| Tear resistance | [MPa] | 4.40 | 5.60 | 6.60 | 7.00 | 6.80 |
| Elongation at break | [%] | 289 | 286 | 264 | 277 | 316 |
| Compression set testing (ISO 815) | | | | | | |
| Compression set 24 h/150° C./hot air/demolded in the cold state | [%] | 38.5 | 30 | 32 | 28 | 34 |

Hybrid elastomers become increasingly slowly reactive with increasing degree of grafting, e.g. with 1,2-polybutadiene, as can be seen in the comparison of the crosslinking characteristics of the different test pieces in Table 5.

High catalyst and crosslinker concentrations can compensate to a certain degree for such kinetic losses that occur with increasing degree of grafting on 1,2-polybutadiene.

Technical Properties of Hybrid Elastomeric Materials in Accordance with the Invention Too low or too high concentrations of shielding groups in the hybrid elastomers in accordance with the invention are qualitatively not beneficial, as already mentioned. Grafted shielding groups should hinder fission and back reactions in aqueous media.

An increasing degree of grafting on 1,2-polybutadiene units, i.e. greater than about 2% by weight at molecular weights of 3000 g/mol leads to an increasingly significant drop in the tear resistance compared to the pure standard LSR materials that can be crosslinked by addition (backbone), as can be seen in FIG. 7 at equal concentration of the crosslinking chemicals.

Moreover, the static long-term sealing force behavior is significantly deteriorated with an increasing proportion of 1,2-polybutadiene, specifically after aerobic and anaerobic hot air degradation. This effect restricts the use of the hybrid elastomers in accordance with the invention to temperatures under 120° C.

FIG. 1 shows the long-term sealing force behavior of different conventional elastomeric materials and hybrid elastomeric materials in accordance with the invention after oxidative hot air degradation at 120° C., the decrease in static sealing force in % being graphed against the storage time in hours. Serving as a comparison to the hybrid elastomeric materials in accordance with the invention based on the formulations of Example 1 (BF109) (2% by weight 1,2-PB B-3000), Example 7 (10% by weight 1,2-PB B-3000), and Example 8 (20% by weight 1,2-PB B-3000) are, for one, an LSR standard material from Example 4 (ALPA 130201;) without organic protecting groups and, on the other hand, the Keltan 2650 polyolefin material referred to by ENB-EPDM (ARLANXEO Netherlands B.V.). The sealing force testing took place according to DIN EN ISO 1183-1, Procedure A.

FIG. 1 shows the influence of an increasing proportion of polyolefin groups in the hybrid elastomeric material in accordance with the invention on the progression of the static sealing force in the long-term test after oxidative hot air degradation at 120° C. using test pieces of Examples 1, 7, and 8 in accordance with the invention, as well as conventional LSR and EPDM materials, Example 4 (LSR standard ALPA 130201) or Keltan 2650 (ARLANXEO Netherlands B.V.).

Too high a residual portion of reactive SiH groups or vinyl groups not consumed in the crosslinking by addition that are still present in the hybrid elastomer in accordance with the invention negatively affects the chemical aging behavior and the chemical long-term stability. This has an effect on the siloxane network due to an increased number of fission or back reactions.

The chemical resistance of the modified hybrid elastomers against so-called pitting is of decisive importance, meaning the aging resistance against polymer degradation and fission reactions due to aggressive acids and with increasing acid concentrations.

An important example is sulfonic acid, which in PEM-FC fuel cells can be created on the membrane by fission reactions of sulfonic groups and then is present in aqueously diluted form. Due to its particular properties, sulfonic acid is used as an equilibration catalyst in the synthesis of LSR polymers and causes ring opening reactions there.

Alkyl benzene sulfonic acid is a suitable testing medium with which the damage pattern of the polymer pitting or so-called silicification on the standard LSR material can be recreated very authentically, even if these structures do not typically occur in the fuel cell.

The contact of the standard LSR material with the smallest concentrations of aqueously diluted alkyl benzene sulfonic acid leads to pronounced polymer degradation in the shortest contact times of 72 h and 144 h, as can be seed in Table 5 for storage temperatures of 75° C.

Figure 2A:
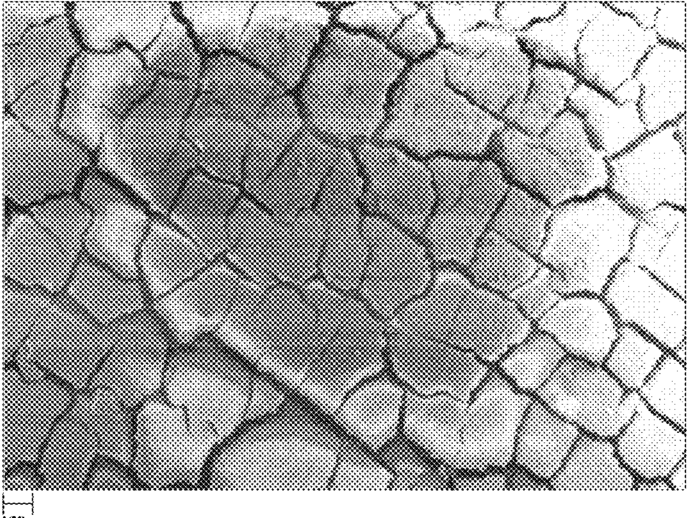
FIGS. 2A to 2C show depolymerization effects on conventional elastomeric materials and hybrid elastomeric materials in accordance with the invention after storage in sulfonic acid on the basis of electron microscope images.
Figure 2B:
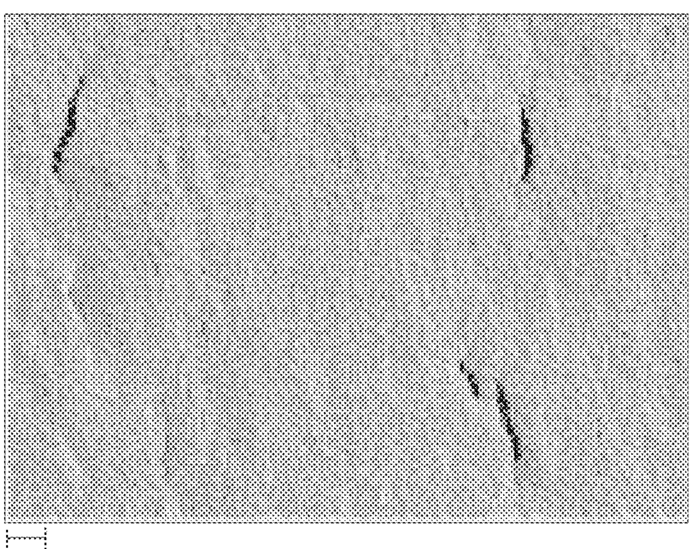
Figure 2C:
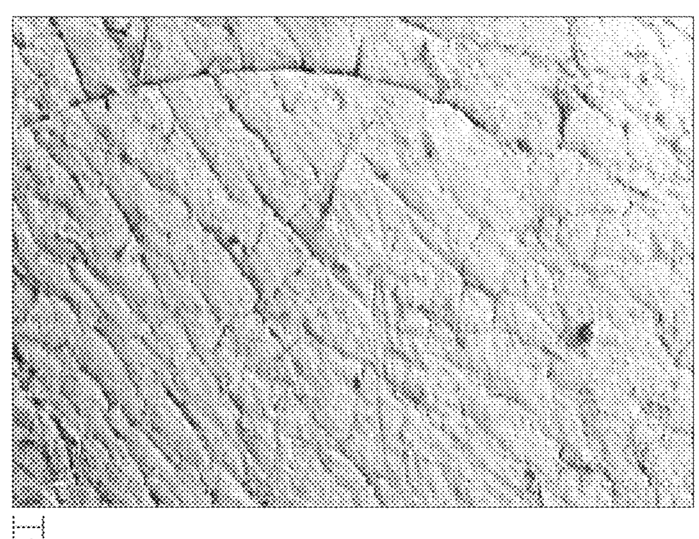

The electron microscope images in FIGS. 2A to 2C illustrate on the basis of the damage patterns the differences in chemical resistance between a standard LSR material and the hybrid elastomeric materials in accordance with the invention of Examples 1 and 2 (BF109 and BF131) in accordance with the invention in addition to the test results summarized in Table 6.

TABLE 6

Storage in alkyl benzene sulfonic acid (acid group concentration 0.091 mol/l) at 75° C.

| | Reference Example 4 (LSR standard ALPA 130201) | | | Example 1 BF109 | | | Example 2 BF131 | | |
|---|---|---|---|---|---|---|---|---|---|
| Test parameter/test piece | Base | | | Base | | | Base | | |
| Storage temperature [° C.] | | 75 | 75 | | 75 | 75 | | 75 | 75 |
| Storage duration [h] | | 72 | 144 | | 72 | 144 | | 72 | 144 |
| pH value | | 2 | 2 | | 2 | 2 | | 2 | 2 |
| Hardness [Shore A] | 41.3 | 39.3 | 35.3 | 58.8 | 55.8 | 54.8 | 53.0 | 53.8 | 54.6 |
| Change in hardness [Shore A] | | −2.0 | −6.0 | | −3.0 | −4.0 | | +0.8 | +1.6 |
| Tear resistance [MPa] | 4.90 | 2.20 | 1.32 | 6.50 | 4.40 | 3.59 | 5.90 | 3.39 | 2.25 |
| Change in the tear resistance [%] | | −55.1 | −73.1 | | −32.3 | −54.8 | | −42.5 | −61.9 |
| Elongation at break [%] | 296 | 162.5 | 79.6 | 194 | | | 263 | 185.2 | 135.4 |
| Change in the elongation at break [%] | | −35.6 | −62.3 | | +1.4 | −23.8 | | −29.6 | −48.5 |
| Volume change [%] | | +0.25 | +3.5 | | +0.8 | +1.2 | | +0.4 | +2.4 |
| Electron microscope image | | | FIG. 2A | | | FIG. 2B | | | FIG. 2C |

The base values specified in the Table correspond to the values measured on the not yet stored test pieces.

TABLE 7

Storage in aqueously diluted FKM ionomer dispersion 3M980EW (acid group concentration: 0.091 mol/l)

Figure 3A:
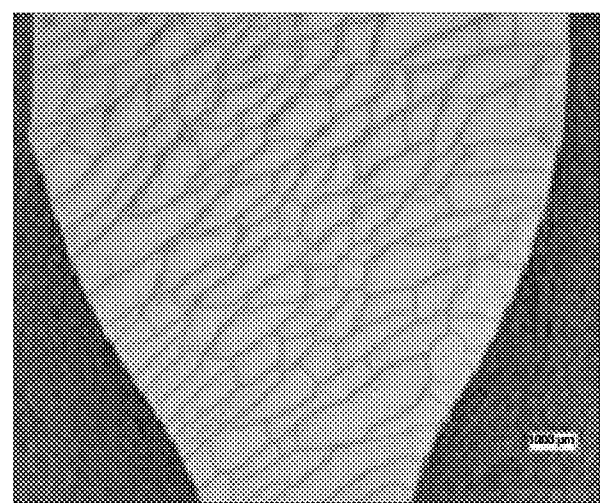
FIGS. 3A to 3C show depolymerization effects on conventional elastomeric materials and hybrid elastomeric materials in accordance with the invention after storage in an FKM ionomer dispersion on the basis electron microscope images.
Figure 3B:
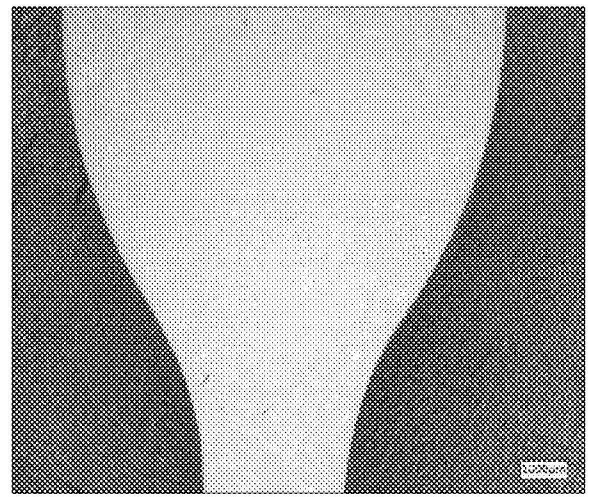
Figure 3C:
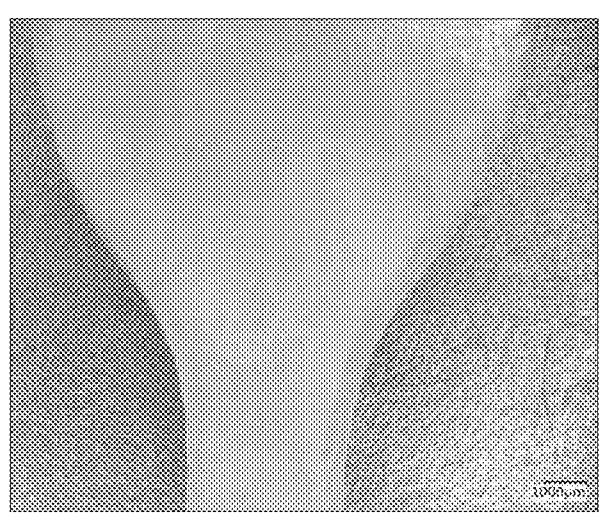

| | Reference Example 4 (LSR standard ALPA 130201 | | | Example 1 BF109 | | | Example 2 BF131 | | |
|---|---|---|---|---|---|---|---|---|---|
| Test parameter/test piece | Base | | | Base | | | Base | | |
| Storage temperature [° C.] | | 75 | 75 | | 75 | 75 | | 75 | 75 |
| Storage duration [h] | | 72 | 336 | | 72 | 336 | | 72 | 336 |
| pH value | | 2 | 2 | | 2 | 2 | | 2 | 2 |
| Hardness [Shore A] | 41.3 | 42.4 | 44.0 | 58.8 | 58.4 | 58.5 | 53.0 | 53.5 | 54.1 |
| Change in hardness [Shore A] | | +1.1 | +2.7 | | −0.4 | −0.3 | | +0.5 | +1.1 |
| Tear resistance [MPa] | 4.90 | 2.01 | 0.93 | 6.50 | 6.00 | 5.70 | 5.90 | 4.00 | 3.60 |
| Change in the tear resistance [%] | | −59.0 | −81.1 | | −7.7 | −12.3 | | −32.2 | −39.0 |
| Elongation at break [%] | 296 | 154.2 | 95.6 | 194 | 182 | 191 | 263 | 190 | 145 |
| Change in the elongation at break [%] | | −47.9 | −67.7 | | −6.2 | −1.5 | | −27.8 | −44.9 |
| Volume change [%] | | +1.9 | +3.7 | | +0.12 | ±0 | | +1.3 | +2.5 |
| Weight change [%] | | +1.1 | +2.8 | | +0.15 | ±0 | | +0.7 | +2.0 |
| Electron microscope image | | | FIG. 3A | | | FIG. 3B | | | FIG. 3C |

The base values specified in the Table correspond to the values measured on the not yet stored test pieces.

The base values specified in the Table correspond to the values measured on the not yet stored test pieces.

A further test with FKM ionomer dispersions, which represents the starting product for the coating of a fuel cell membrane, was performed on test pieces of Examples 1 and 2 as well as with the LSR reference material. The results are summarized in Table 7 and visualized in the electron microscope images of FIGS. 3A to 3C.

The coatings produced from the dispersions are necessary for proton transport in the electrochemical processes in a fuel cell. The FKM ionomer dispersions are composed of polytetrafluoroethylene and perfluorosulfonyvinylether, the latter forming PFSA (PerFluoroSulfonic Acid) in an aqueous medium. These are available from various manufacturers such as, e.g., Dow Chemicals, Du Pont, and Solvay.

The test pieces were stored in the product 3M980EW (manufacturer: 3M) with an acid group concentration of 0.091 mol/l, also at 75° C., 72 h and 336 h. The advantage of the hybrid elastomers in accordance with the invention compared to a standard LSR material becomes particularly clear in this real test medium with regard to the chemical resistance, because it produces the unfavorable, i.e. chemically aggressive conditions due to its high concentration of PFSA. While pure LSR (reference ALPA 130201, Example 4) severely degrades under these conditions (cf. FIG. 3A), the hybrid elastomeric materials in accordance with the invention, especially according to Example 1 (BF109), show an excellent media resistance (Table 7 and FIGS. 2A and 2B).

The hybrid elastomeric material in accordance with the invention according to Example 1 (BF109), followed by Example 2 (BF131), shows significantly better chemical resistance in the test media (Table 6 and Table 7) than conventional LSR materials. This is the main advantage of the hybrid elastomers in accordance with the invention.

Figure 4:
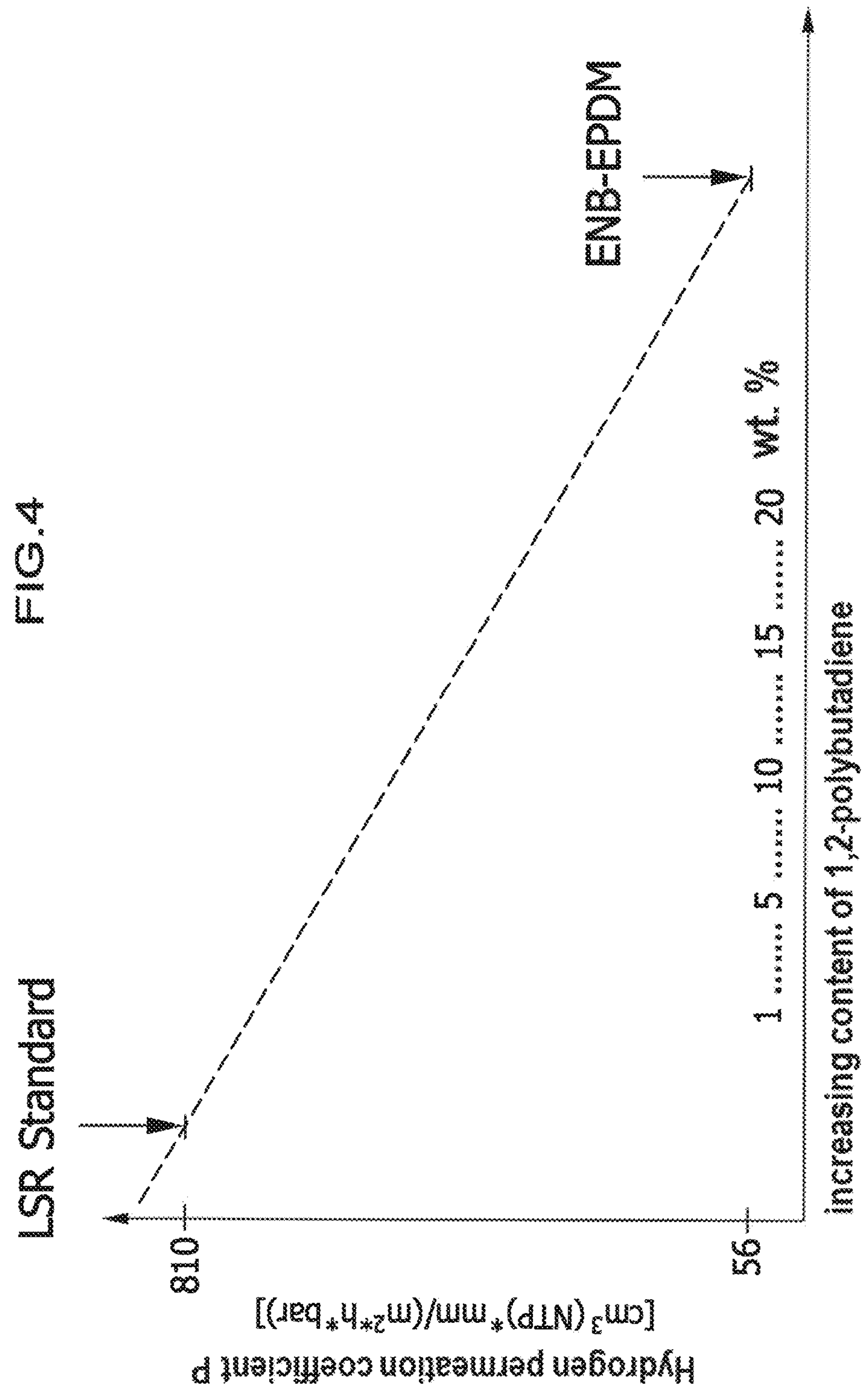
FIG. 4 shows schematically the influence of the 1,2-polybutadiene content of polymeric materials on the hydrogen permeation coefficient P.

The effect of the degree of grafting of organic shielding groups on the gas permeation resistance P is finally depicted schematically in FIG. 4.

For standard LSR, typically a so-called P-value for hydrogen permeation in the dimension [$cm^3$(NTP)·mm/($m^2$·h bar] of 810 P is obtained at 20° C. and 0% relative humidity, while EPDM materials (ethylene-propylene-diene-rubber; here as an equivalent for 100% by weight 1,2-polybutadiene) typically have P-values of 56 P. Compared to the standard LSR, the hybrid elastomers in accordance with the invention have significantly reduced P values, as is illustrated schematically in FIG. 4 as a function of the 1,2-polybutadiene content.

The test results of the hybrid elastomeric material obtained in Example 9 after storage at 75° C. for 1000 h in an aqueous FKM ionomer dispersion with an acid group proportion of c=0.091 mol/1 (pH=1.5 to 2; available as 3M980EW from 3M) are summarized in Table 8 in comparison with further corresponding test values of the materials of Examples 1 and 8 as well as a material from the prior art (ShinEtsu X34-4269). Electron microscope images of these materials after storage are shown in FIGS. 5A to 5D.

TABLE 8

Figure 5A:
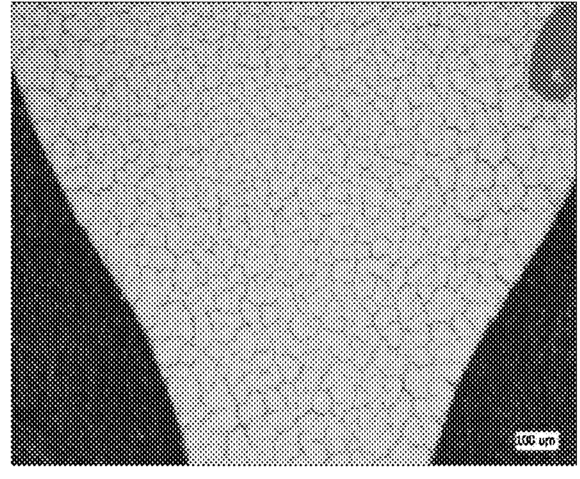
FIG. 5A to 5D show electron microscope images of a conventional elastomeric material and different hybrid elastomeric materials in accordance with the invention and after storage in an FKM ionomer dispersion.
Figure 5B:
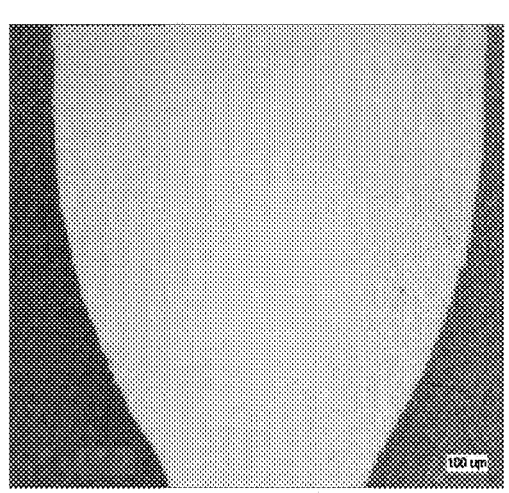
Figure 5C:
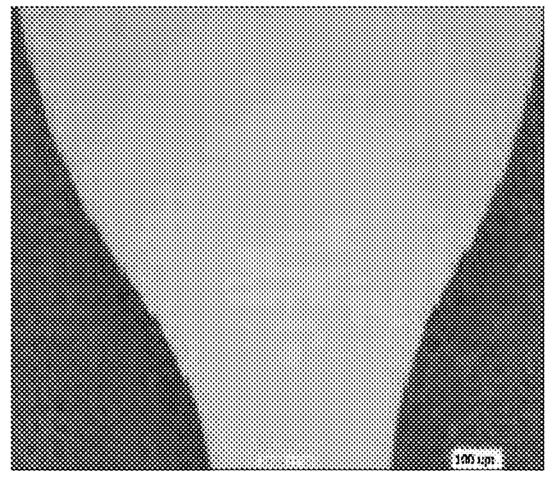
Figure 5D:
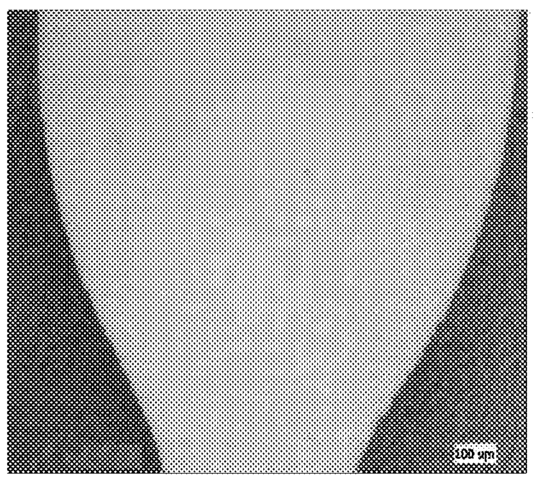

| Test parameter/test piece | ShinEtsu X34-4269 | Example 1 BF 109 | Example 8 BF 290 | Example 9 BF 307 |
|---|---|---|---|---|
| Hardness [Shore A] | 39.39 | 44.1 | 48.1 | 36.0 |
| Hardness change [Shore A] | −0.7 | −0.1 | +2.7 | −1.2 |
| Elongation at break [%] | 117 | 390 | 290 | 155 |
| Change in the elongation at break [%] | −54.5 | +14.3 | −3.7 | −8.7 |
| Tear resistance [MPa] | 1.17 | 5.8 | 4.1 | 2.5 |
| Change in the tear resistance [%] | −74.0 | +1.8 | −8.5 | −11.5 |
| Volume change [%] | −1.6 | −0.43 | −0.11 | +0.21 |
| Weight change [%] after redrying for 24 h at 100° C. | −13.7 | −0.67 | −0.41 | −0.30 |
| Electron microscope image | FIG. 5A | FIG. 5B | FIG. 5C | FIG. 5D |

The compression set determined in the case of the materials of Example 9 (BF307) was 23.5% after hot air degradation (24 h/150° C./demolded in the cold state). The degree of compression was 25%.

The hybrid elastomeric materials according to Example 9 in accordance with the invention show a significantly improved chemical resistance against an aqueously diluted FKM ionomer dispersion compared to the conventional ShinEtsu X34-4269 material (available from SHIN-ETSU SILICONES EUROPE B.V.) and also compared to the hybrid elastomer BF 109 obtained in accordance with the invention in Example 1.

Furthermore, a significantly improved extraction resistance can be observed in the hybrid elastomeric material obtained in Example 9 (cf. Table 12 below).

Further test results for hybrid elastomeric materials in accordance with the invention from Examples 1, 1A, 1B, 1C, and 1D are summarized in the following Table 9.

TABLE 9

| Test parameter/test piece | Example 1A | Example 1B | Example 1C | Example 1D | Example 1 |
|---|---|---|---|---|---|
| Hardness [Shore A] | 55.6 | 53.8 | 57.6 | 57.0 | 53.7 |
| Density [g/cm$^3$] | 1.103 | 0.864 | 1.066 | 1.090 | 1.127 |
| Stress modulus M25% [MPa] | 1.00 | 1.00 | 0.90 | 1.00 | 0.90 |
| Stress modulus M50% [MPa] | 1.77 | 1.72 | 1.73 | 1.92 | 1.63 |
| Stress modulus M100% [MPa] | 3.20 | 2.40 | 3.10 | 3.10 | 3.00 |
| Stress modulus M200% [MPa] | 4.92 | 3.22 | — | — | 4.78 |
| Tear resistance [MPa] | 5.30 | 3.70 | 4.40 | 4.40 | 6.58 |
| Elongation at break [%] | 229 | 253 | 189 | 179 | 291 |
| Compression set *) [%] | 73 | 82 | 52 | — | 14 |

*) The compression set values in Table 9 were measured on test pieces after demolding in the cold state, which were previously exposed to hot air of 150° C. for 24 h at a degree of compression of 25%.

In the following Table 10, mechanical parameters of the hybrid elastomeric materials in accordance with the invention that can be achieved in accordance with the invention are compared with the values of a conventional LSR material, which is available under the trade name ShinEtsu X34-4269 from SHIN-ETSU SILICONES EUROPE B.V. Significant differences emerge, in particular, in the chemical resistance against aqueous FKM ionomer dispersions (here: 3M725EW) with an acid group content of c=0.091 Mol/l. The storage time was therefore shortened for the reference material from 1000 h to 336 h.

TABLE 10

| Parameter/test piece | Example 1E | Example 1F | Example 8A | ShinEtsu X34-4269 |
|---|---|---|---|---|
| Storage temperature [° C.] | 75 | 75 | 75 | 75 |
| Storage duration [h] | 1000 | 1000 | 1000 | 336 |
| Acid concentration [mol/1] | 0.091 | 0.091 | 0.091 | 0.091 |
| Hardness change [Shore A] | +6.5 | +0.2 | +0.1 | +2.7 |
| Tear resistance [Mpa] after storage | 5.60 | 5.80 | 3.50 | 0.80 |
| Change in tear resistance [%] | +1.4 | +1.8 | +2.9 | −85.2 |
| Elongation at break [%] | 277 | 390 | 138 | 92 |
| Change in elongation at break [%] | −13.9 | +14.3 | +/−0 | −68.4 |
| Volume change [%] | −0.3 | −0.4 | +3.5 | +4.4 |
| Weight change [%] | −0.1 | −0.2 | +3.6 | +4.1 |

Test results for hybrid elastomeric materials in accordance with the invention from Examples 1 (BF 109), 8 (BF 290), and 9 (BF 307) are summarized in the following Table 11.

TABLE 11

| Test parameter/test piece | Example 1 BF109 | Example 8 BF290 | Example 9 BF307 |
|---|---|---|---|
| Hardness [Shore A] | 44.0 | 45.4 | 37.2 |
| Stress modulus M25% [MPa] | 0.90 | 1.00 | 0.90 |
| Stress modulus M50% [MPa] | 1.63 | 1.62 | 1.22 |
| Stress modulus M100% [MPa] | 3.00 | 3.00 | 1.90 |
| Stress modulus M200% [MPa] | 4.78 | — | — |
| Tear resistance [MPa] | 6.58 | 4.50 | 2.90 |
| Elongation at break [%] | 291 | 160 | 170 |
| Compression set [%] *) | 14 | 20 | 27 |

*) The compression set values in Table 11 were measured on test pieces after demolding in the cold state, which were exposed to hot air of 150° C. for 24 h at a degree of compression of 25%.

In addition, a better gas permeation resistance can be observed at higher polybutadiene contents, in particular at polybutadiene contents of 30% to 40% by weight in the total formulation.

A further important property of elastomeric sealing materials, in particular of hybrid elastomers in accordance with the invention, is their extraction resistance, which counteracts so-called pitting or so-called silicification. Weight loss of the sealing materials is often associated with the washing away of particles, which can block or clog the electrochemically active proton exchange membranes in fuel cells. This leads to irreversible performance losses in fuel cells.

The property of extraction resistance can be easily tested using the weight loss after storage in the FKM ionomer dispersion specified above. The weight losses of five different hybrid elastomers in accordance with the invention at different storage times are summarized in the following Table 12. The weight losses in % by weight were determined after the previously stored test pieces were redried for 25 h at 80° C. For comparison, two test pieces of conventional materials, namely LSR ShinEtsu X34-4269 (available from SHIN ETSU SILICONES EUROPE B.V.) and addition-crosslinking liquid fluorosilicone DOW Silastic FL30-9201 (available from Dow Chemicals Company) were added to the Table.

TABLE 12

| Test piece/storage time | 500 h | 1000 h | 1500 h | 2400 h |
|---|---|---|---|---|
| Example 1E (BF 109B) | −0.50 | −0.67 | −1.12 | −1.27 |
| Example 8 (BF290) | −0.38 | −0.41 | −0.40 | −0.52 |
| Example 9 (BF 307) | −0.02 | −0.30 | — | — |
| ShinEtsu X34-4269 | −12.00 | 13.70 | 18.70 | 25.01 |
| DOW Silastic FL30-9201 | −2.32 | −2.36 | −2.41 | −2.55 |

The data in Table 12 show that the extraction resistance is improved with increasing polybutadiene proportions and tends towards zero at a proportion of hydrated polybutadiene of 30% by weight. By contrast, the extraction values for the two conventional test pieces are significantly higher.

The extraction values specified in Table 12 can also be applied to the pure water resistance and the resistance to aqueous coolants.

The invention claimed is:

1. A hybrid elastomeric material, in particular for use as a sealing material in fuel cells, wherein the hybrid elastomeric material comprises a hybrid elastomer with a proportion of a siloxane polymeric material and a proportion of a polyolefin elastomeric material, wherein the two materials are crosslinked with one another by addition, wherein the siloxane polymeric material comprises (i) a siloxane polymer of formula (I)

(I)

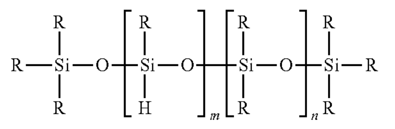

wherein the radicals R independent of one another mean H, $CH_3$, vinyl, phenyl, $(CH_2)_xCH_3$, and/or $C_3H_6O(C_2H_4O)_y(C_3H_5O)_zR'$; wherein m=1 to about 100, n=0 to 1000, x=1 to 30, y=0 to 20, z=0 to 30, and wherein the sum of m+n≥3 and R' mean H, $CH_3$, or $(CH_2)_xCH_3$;

as well as (ii) a siloxane of formula (II)

(II)

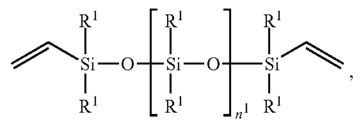

wherein the radicals $R^1$ independent of one another each mean $CH_3$, vinyl, and phenyl and $n^1$ has a value in the range of 0 to 3000;

wherein the polyolefin elastomeric material is 1,2-polybutadiene, and wherein the sum of the proportions of the siloxane polymer of formula (I) and the siloxane of formula (II) is about 50% by weight to about 90% by weight, relative to the total content of the siloxane polymeric material and the polyolefin elastomeric material.

2. The hybrid elastomeric material in accordance with claim 1, wherein the siloxane polymeric material has one or more polysiloxanes with pendant groups and/or terminal groups, which are selected from H, $C_1$-$C_{30}$ alkyl groups, $C_2$-$C_{30}$ alkenyl groups, and aryl groups.

3. The hybrid elastomeric material in accordance with claim 2, wherein the siloxane polymeric material comprises one or more modified dimethyl siloxanes, wherein the methyl groups are partially substituted by hydrogen with the formation of SiH groups and vinyl groups.

4. The hybrid elastomeric material in accordance with claim 3, wherein the ratio of the proportions of SiH groups to vinyl groups in the siloxane polymer of formula (I) and in the siloxanes of formulas (II) and (III) considered in the totality is in the range of about 1:0.5 to about 1:4.5.

5. The hybrid elastomeric material in accordance with claim 1, wherein the hybrid elastomeric material is crosslinked by addition using a siloxane crosslinker.

6. The hybrid elastomeric material in accordance with claim 5, wherein the siloxane crosslinker is selected from crosslinkers of formula (III)

(III)

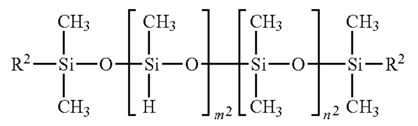

wherein the radicals $R^2$ independent of one another represent H and $CH_3$ and wherein the value for $m^2$ is in the range of 1 to about 100 and the value for $n^2$ is in the range of 0 to about 500.

7. The hybrid elastomeric material in accordance with claim 1, wherein the polyolefin elastomeric material has functional groups as shielding groups, which are selected from linear and branched $C_2$-$C_8$ alkyl and alkenyl groups.

8. The hybrid elastomeric material in accordance with claim 7, wherein the polyolefin elastomeric material has a proportion of shielding groups of about 40% by weight to about 92% by weight.

9. The hybrid elastomeric material in accordance with claim 1, wherein the sum of the proportions of the siloxane polymer of formula (I) and the siloxane of formula (II) about 60% by weight to about 70% by weight, relative to the total content of the siloxane polymeric material and the polyolefin elastomeric material.

10. The hybrid elastomeric material in accordance with claim 1, wherein the proportion of the polyolefin elastomeric material is about 1% by weight to about 50% by weight, relative to the total content of the siloxane polymeric material and the polyolefin elastomeric material.

11. The hybrid elastomeric material in accordance with claim 1, wherein the hybrid elastomeric material comprises one or more fillers, wherein the proportion of the fillers in the hybrid elastomeric material is about 5% by weight to about 50% by weight, relative to the total weight of the hybrid elastomeric material.

12. The hybrid elastomeric material in accordance with claim 11, wherein the filler or fillers is/are selected from silica-based, silicone resin-based, and titanate-based fillers.

13. The hybrid elastomeric material in accordance with claim 1, wherein the siloxane polymeric material that can be crosslinked by addition and the polyolefin elastomeric material are catalytically crosslinked by addition.

14. A polymer electrolyte fuel cell stack with a plurality of fuel cells, wherein the stack comprises sealing elements, which are produced using a hybrid elastomeric material in accordance with claim 1.

15. A method for producing a hybrid elastomeric material in accordance with claim 1, comprising the steps providing a reaction mixture comprising a proportion of a siloxane polymeric material and a proportion of a polyolefin elastomeric material; and crosslinking the two materials by addition.

16. The method in accordance with claim 15, wherein the reaction mixture is produced from a component A and a component B, wherein the component A comprises a proportion of a first polysiloxane material, a proportion of a polyolefin elastomeric material, and a catalyst for the crosslinking by addition, and wherein the component B comprises a proportion of the first polysiloxane material and a proportion of a second siloxane material that is different from the first polysiloxane material, wherein the first polysiloxane material comprises a vinyl polysiloxane with terminal vinyl groups and the second siloxane material comprises a siloxane with pendant and/or terminal SiH groups.

17. The method in accordance with claim 16, wherein the component B comprises a proportion of a retarder.

18. The method in accordance with claim 15, wherein the reaction mixture comprises a filler, in particular in the form of a hydrophobized and/or hydrophilic mineral filler.

19. The method in accordance with claim 18, wherein the filler is provided in a masterbatch and the masterbatch is added to the reaction mixture, preferably as part of the component A and/or the component B.

20. A use of a hybrid elastomeric material in accordance with claim 1 in a screen printing process, in particular for applying the hybrid elastomer as a sealant to a substrate.

21. The use in accordance with claim 20, wherein the hybrid elastomeric material is applied to the substrate in a layer thickness of about 10 μm to about 500 μm, in particular about 10 μm to about 100 μm.

22. The use in accordance with claim 20, wherein the hybrid elastomeric material comprises a filler forming a closed-cell pore structure, the content of which is, in particular, about 0.5% by weight to about 4% by weight relative to the total weight of the hybrid elastomeric material.

* * * * *